(12) United States Patent
Nitta et al.

(10) Patent No.: US 12,492,370 B2
(45) Date of Patent: Dec. 9, 2025

(54) **METHOD FOR PRODUCING PROTEIN USING A *TALAROMYCES CELLULOLYTICUS* STRAIN HAVING REDUCED ACTIVITY OF PEP4**

(71) Applicant: AJINOMOTO CO., INC., Tokyo (JP)

(72) Inventors: Nobuhisa Nitta, Kanagawa (JP);
Hiroaki Fukada, Kanagawa (JP);
Kazutaka Shimbo, Kanagawa (JP);
Akiko Matsudaira, Kanagawa (JP);
Toshiki Watanabe, Kanagawa (JP);
Yoshihiro Usuda, Kanagawa (JP)

(73) Assignee: AJINOMOTO CO., INC., Tokyo (JP)

( * ) Notice: Subject to any disclaimer, the term of this patent is extended or adjusted under 35 U.S.C. 154(b) by 414 days.

(21) Appl. No.: 18/063,181

(22) Filed: Dec. 8, 2022

(65) Prior Publication Data
US 2023/0212503 A1 Jul. 6, 2023

Related U.S. Application Data

(63) Continuation of application No. PCT/JP2021/021749, filed on Jun. 8, 2021.

(30) Foreign Application Priority Data

Jun. 11, 2020 (JP) ................................. 2020-101310

(51) Int. Cl.
*C12N 1/14* (2006.01)
(52) U.S. Cl.
CPC ........ *C12N 1/145* (2021.05); *C12N 2501/734* (2013.01)
(58) Field of Classification Search
None
See application file for complete search history.

(56) References Cited

U.S. PATENT DOCUMENTS

| | | | |
|---|---|---|---|
| 6,103,515 A | 8/2000 | Treichler et al. | |
| 6,291,209 B1 | 9/2001 | Lehmbeck | |
| 11,384,379 B2* | 7/2022 | Yahagi | C12N 1/14 |
| 11,746,342 B2* | 9/2023 | Fukada | C12P 1/02 |
| | | | 435/71.1 |
| 2004/0115785 A1 | 6/2004 | Fong et al. | |
| 2014/0370546 A1 | 12/2014 | Landowski et al. | |
| 2016/0237466 A1 | 8/2016 | Landowski et al. | |
| 2020/0255869 A1* | 8/2020 | Fukada | C12N 15/80 |
| 2020/0263219 A1 | 8/2020 | Yahagi et al. | |

FOREIGN PATENT DOCUMENTS

| | | |
|---|---|---|
| JP | 2-104279 A | 4/1990 |
| JP | 2000-507106 A | 6/2000 |
| JP | 2006-512891 A | 4/2006 |
| JP | 2015-512611 A | 4/2015 |
| JP | 2016-131533 A | 7/2016 |
| JP | 2016-523552 A | 8/2016 |
| JP | 2016-158599 A | 9/2016 |
| WO | WO2013/174927 A1 | 11/2013 |
| WO | WO2019/059404 A1 | 3/2019 |
| WO | WO2019/073954 A1 | 4/2019 |

OTHER PUBLICATIONS

Chica et al. Curr Opin Biotechnol. Aug. 2005;16(4):378-84. (Year: 2005).*
Singh et al. Curr Protein Pept Sci. 2017, 18, 1-11 (Year: 2017).*
Extended European Search Report for European Patent App. No. 21821030.0 (Dec. 2, 2024).
Database Uniprot [online], Laura De Eugenio et al.: "UNIPROT:A0A364KMY3", Database accession No. A0A364KMY3, Dec. 1, 2017, 1 pg.
Inoue, H., et al., "Construction of a starch-inducible homologous expression system to produce cellulolytic enzymes from Acremonium cellulolyticus," J. Ind. Microbiol. Biotechnol. 2013;40:823-830.
Landowski, C. P., et al., "Enabling Low Cost Biopharmaceuticals: A Systematic Approach to Delete Proteases from a Well-Known Protein Production Host Trichoderma reesei," Plos One 2015;10(8):e0134723:28 pp.
Database UniProt [online], Accession No. B6Q342_TALMQ, Dec. 11, 2019, Internet, [retrieved on Jul. 20, 2021].
Database UniProt [online], Accession No. B8M4Z6_TALSN, Feb. 26, 2020, Internet [retrieved on Jul. 20, 2021].
International Search Report for PCT Patent App. No. PCT/JP2021/021749 (Aug. 10, 2021).
Genbank database, Fujii, T., et al., Accession No. GAM39722.1, Pep4 homolog [Talaromyces pinophilus], Jan. 20, 2015, 2 pp.

\* cited by examiner

*Primary Examiner* — Christian L Fronda
(74) *Attorney, Agent, or Firm* — Cermak & McGowan LLP; Shelly Guest Cermak

(57) ABSTRACT

A method for producing a protein is provided. An objective protein is produced by culturing in a culture medium *Talaromyces cellulolyticus* having an objective protein-producing ability, which has been modified so that the activity of a Pep4 protein is reduced.

19 Claims, 2 Drawing Sheets
Specification includes a Sequence Listing.

METHOD FOR PRODUCING PROTEIN USING A *TALAROMYCES CELLULOLYTICUS* STRAIN HAVING REDUCED ACTIVITY OF PEP4

This application is a Continuation of, and claims priority under 35 U.S.C. § 120 to, International Application No. PCT/JP2021/021749, filed Jun. 8, 2021, and claims priority therethrough under 35 U.S.C. § 119 to Japanese Patent Application No. 2020-101310, filed Jun. 8, 2020, the entireties of which, as well as all citations cited herein, are incorporated by reference herein. The Sequence Listing filed electronically on Dec. 7, 2022 in the ST26 format is also hereby incorporated by reference (File name: 2022-11-15T_US-643_SEQ_LIST_ST26.xml; file size: 110 KB, date created: 2022-11-15).

BACKGROUND

Technical Field

The present invention relates to a method for producing a protein.

Background Art

As methods for producing proteins, there have been reported methods of using various microorganisms such as coryneform bacteria, *Bacillus* bacteria, yeasts, and filamentous fungi.

For example, Non-patent document 1 discloses production of host-derived cellulases using a filamentous fungus *Talaromyces cellulolyticus* (formerly, *Acremonium cellulolyticus*). In addition, Patent document 1 discloses production of antibodies using filamentous fungi. In addition, Patent document 2 discloses production of multimeric proteins having a cavity using filamentous fungi such as *Talaromyces cellulolyticus*.

In addition, Patent documents 3 and 4 disclose production of heterologous proteins using filamentous fungi having an attenuated activity of endogenous protease. In addition, Patent document 5 discloses production of heterologous proteins using filamentous fungi having an attenuated activity of endogenous alkaline protease.

In addition, Patent document 6 discloses production of heterologous proteins using yeast deficient in the activity of carboxypeptidase ysca. This document further describes that the yeast may be further deficient in the activity of peptidase(s) selected from yscA, yscB, yscY, and yscS.

In addition, Patent document 7 discloses production of proteins using *Talaromyces cellulolyticus* modified so that the activity of a protease YscB is reduced.

However, no relationship between a Pep4 protein and protein production in *Talaromyces cellulolyticus* has been reported.

PRIOR ART REFERENCES

Patent Documents

Patent document 1: Japanese Patent Laid-open (Translation of PCT Application) No. 2006-512891
Patent document 2: Japanese Patent Laid-open (Kokai) No. 2016-158599
Patent document 3: Japanese Patent Laid-open (Translation of PCT Application) No. 2015-512611
Patent document 4: Japanese Patent Laid-open (Translation of PCT Application) No. 2016-523552
Patent document 5: Japanese Patent Laid-open (Translation of PCT Application) No. 2000-507106
Patent document 6: Japanese Patent Laid-open (Kokai) No. 1990-104279
Patent document 7: WO2019/073954

Non-Patent Documents

Non-patent document 1: Inoue H, et al., Construction of a starch-inducible homologous expression system to produce cellulolytic enzymes from *Acremonium cellulolyticus*. J Ind Microbiol Biotechnol. 2013 August; 40(8):823-30.

SUMMARY

An aspect of the present invention is to provide a method for producing a protein.

In order to achieve the aforementioned aspect, it is described herein that a protein-producing ability of *Talaromyces cellulolyticus* is improved by modifying *Talaromyces cellulolyticus* so that the activity of a Pep4 protein is reduced.

It is an aspect of the present invention to provide a method for producing an objective protein, comprising culturing a *Talaromyces cellulolyticus* strain having an objective protein-producing ability in a culture medium, wherein the *Talaromyces cellulolyticus* strain has been modified so that the activity of a Pep4 protein is reduced as compared with a non-modified strain.

It is a further aspect of the present invention to provide the method as described above, wherein the activity of the Pep4 protein is reduced by reducing the expression of a pep4 gene or disrupting a pep4 gene.

It is a further aspect of the present invention to provide the method as described above, wherein the activity of the Pep4 protein is reduced by deletion of a pep4 gene.

It is a further aspect of the present invention to provide the method as described above, wherein the Pep4 protein is a protein selected from the group consisting of: (a) a protein comprising the amino acid sequence of SEQ ID NO: 71; (b) a protein comprising the amino acid sequence of SEQ ID NO: 71, but which includes substitution, deletion, insertion, and/or addition of 1 to 10 amino acid residues, and wherein said protein has a protease activity; (c) a protein comprising an amino acid sequence having an identity of 90% or higher to the amino acid sequence of SEQ ID NO: 71, and wherein said protein has a protease activity.

It is a further aspect of the present invention to provide the method as described above, wherein the *Talaromyces cellulolyticus* strain has been further modified so that the activity of a YscB protein and/or a CreA protein is reduced as compared with a non-modified strain.

It is a further aspect of the present invention to provide the method as described above, wherein the activity of the YscB protein and/or the CreA protein is reduced by reducing the expression of a yscB gene and/or a creA gene or disrupting a yscB gene and/or a creA gene.

It is a further aspect of the present invention to provide the method as described above, wherein the activity of the YscB protein and/or the CreA protein is reduced by deletion of a yscB gene and/or a creA gene.

It is a further aspect of the present invention to provide the method as described above, wherein the *Talaromyces cellulolyticus* strain is derived from *Talaromyces cellulolyticus* strain 56-25 (NITE BP-01685).

It is a further aspect of the present invention to provide the method as described above, further comprising collecting the objective protein.

It is a further aspect of the present invention to provide the method as described above, wherein the objective protein accumulates in the culture medium as a result of the culturing.

It is a further aspect of the present invention to provide the method as described above, wherein the objective protein is expressed as a fused protein and said fused protein comprises a signal peptide that functions in the *Talaromyces cellulolyticus* strain.

It is a further aspect of the present invention to provide the method as described above, wherein the objective protein is a heterologous protein.

It is a further aspect of the present invention to provide the method as described above, wherein the objective protein is a protein derived from human.

It is a further aspect of the present invention to provide the method as described above, wherein the objective protein is an antibody-related molecule.

DETAILED DESCRIPTION OF THE EXEMPLARY EMBODIMENTS

Figure 1:
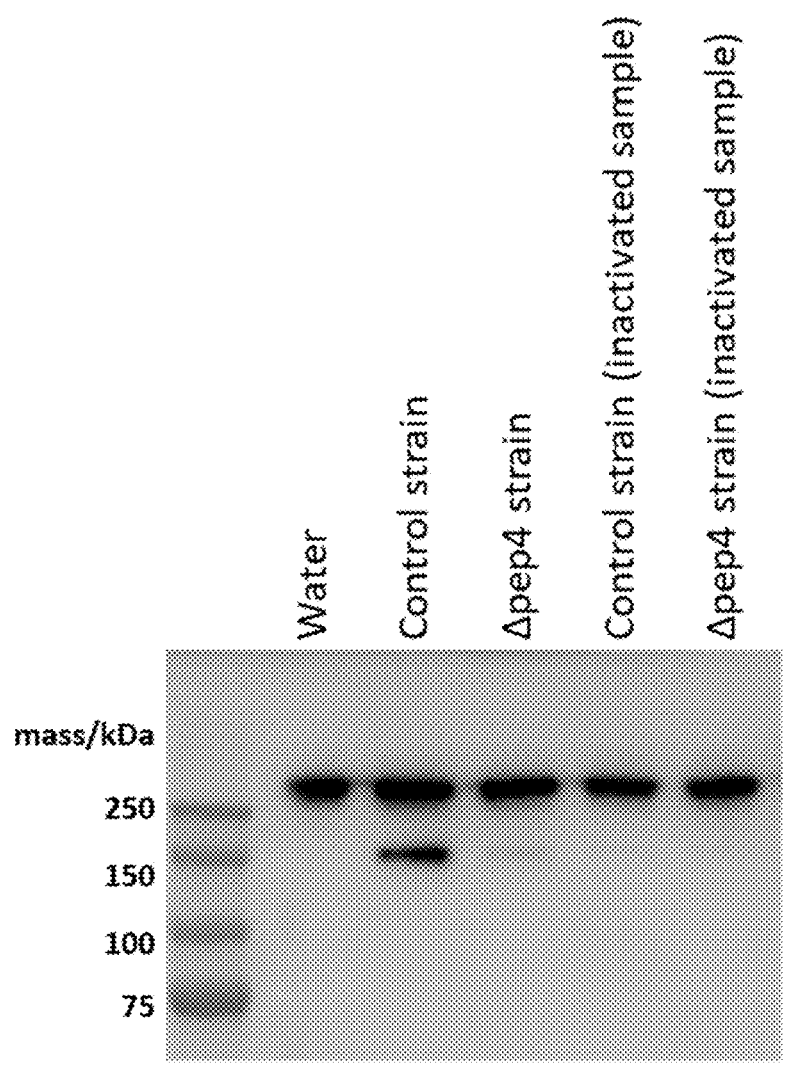
FIG. 1 shows a diagram (photograph) showing a result of degradation of Trastuzumab by supernatants of *T. cellulolyticus* control strain and Δpep4 strain.

The method as described herein is a method for producing an objective protein using *Talaromyces cellulolyticus*. *Talaromyces cellulolyticus* used in this method is also referred to as "the microorganism as described herein".

<1> Microorganism

The microorganism as described herein is *Talaromyces cellulolyticus* having an objective protein-producing ability, which has been modified so that the activity of a Pep4 protein is reduced. In the descriptions concerning the microorganism as described herein, the microorganism or *Talaromyces cellulolyticus* to be used for constructing the same is also referred to as a "host".

<1-1> *Talaromyces cellulolyticus*

The microorganism as described herein is *Talaromyces cellulolyticus*. A former name of *Talaromyces cellulolyticus* is *Acremonium cellulolyticus*. That is, *Acremonium cellulolyticus* has been reclassified to *Talaromyces cellulolyticus* due to revision of phylogenetic taxonomy (FEMS Microbiol. Lett., 2014, 351:32-41). Specific examples of *Talaromyces cellulolyticus* include strains Cl (Japanese Patent Laid-open (Kokai) No. 2003-135052), CF-2612 (Japanese Patent Laid-open (Kokai) No. 2008-271927), TN (FERM BP-685), S6-25 (NITE BP-01685), Y-94 (FERM BP-5826, CBS 136886), and derivative strains thereof. The phrase "*Talaromyces cellulolyticus*" collectively refers to fungi classified as *Talaromyces cellulolyticus* at any time, whether before, on, or after the filing of the present application. That is, a fungus once classified to *Talaromyces cellulolyticus* should be regarded as *Talaromyces cellulolyticus* even if phylogenetic taxonomy thereof is changed in future.

The strain S6-25 was originally deposited at the independent administrative agency, National Institute of Technology and Evaluation, Patent Microorganisms Depositary (#122, 2-5-8 Kazusakamatari, Kisarazu-shi, Chiba-ken, 292-0818, Japan) on Aug. 8, 2013, and then converted to an international deposit under the provisions of the Budapest Treaty on Nov. 15, 2013, and assigned an accession number of NITE BP-01685. The strain S6-25 is a strain obtained from the strain TN (FERM BP-685) and has a high cellulase-producing ability. The strain TN is a strain obtained from the strain Y-94 (FERM BP-5826, CBS 136886) (Japanese Patent Laid-open (Kokai) No. 2011-193773).

These strains can be obtained from, for example, the depositories at which the strains were deposited. Also, the strain Y-94 can be obtained from, for example, CBS-KNAW Collections (Netherlands).

The microorganism as described herein can be obtained by modifying *Talaromyces cellulolyticus* such as the strains exemplified above. That is, the microorganism may be a modified strain derived from any of the strains exemplified above. The microorganism may specifically be, for example, a modified strain derived from the strain 56-25 or Y-94. The microorganism may more specifically be, for example, a modified strain derived from the strain 56-25. The order of carrying out modifications for constructing the microorganism is not particularly limited.

<1-2> Objective Protein-Producing Ability

The microorganism as described herein has an objective protein-producing ability. The phrase "a microorganism having an objective protein-producing ability" refers to a microorganism having an ability to produce an objective protein. The phrase "a microorganism having an objective protein-producing ability" may specifically refer to a microorganism having an ability to express an objective protein and accumulate an objective protein in a culture broth in such a degree that the objective protein can be collected therefrom, when the microorganism is cultured in a culture medium. The phrase "accumulation in a culture broth" may specifically refer to, for example, accumulation in a culture medium, on a cell surface layer, in microbial cells, or in/on a combination thereof. When the objective protein is accumulated outside microbial cells, for example, in a culture medium or on a cell surface layer, this can also be referred to as "secretion" or "secretory production" of the objective protein. That is, the microorganism may have a secretory production ability of the objective protein (an ability to produce the objective protein by secretory production). The objective protein may accumulate particularly in a culture medium. The accumulation amount of the objective protein may be, for example, 10n/L or more, 1 mg/L or more, 100 mg/L or more, or 1 g/L or more, in terms of the accumulation amount in a culture broth. The microorganism may have an ability to produce a single kind of objective protein, or two or more kinds of objective proteins.

The microorganism as described herein may be a microorganism inherently having an objective protein-producing ability, or may be a microorganism modified so as to have an objective protein-producing ability. The microorganism can typically be a microorganism inherently having a cellulase-producing ability (an ability to produce cellulase). The microorganism may also be a microorganism modified so that an objective protein-producing ability inherently possessed by the microorganism has been enhanced. The microorganism having an objective protein-producing ability can be obtained by, for example, imparting an objective protein-producing ability to such *Talaromyces cellulolyticus* as mentioned above, or enhancing an objective protein-producing ability of such *Talaromyces cellulolyticus* as mentioned above. The objective protein-producing ability can be imparted or enhanced by, for example, introduction of a genetic construct for expression of the objective protein, introduction of another modification for improving the objective protein-producing ability, or a combination thereof.

The microorganism as described herein has an objective protein-producing ability at least based on possession of a genetic construct for expression of the objective protein. The microorganism may have an objective protein-producing ability specifically based on possession of a genetic construct for expression of the objective protein or on the basis of a combination of possession of a genetic construct for expression of the objective protein and another characteristic. That is, the microorganism has a genetic construct for expression of the objective protein. The microorganism may have one copy or two or more copies of the genetic construct for expression of the objective protein. The microorganism may have a single kind of genetic construct for expression of the objective protein, or may have two or more kinds of genetic constructs for expression of the objective protein. The copy number and the number of kinds of the genetic construct for expression of the objective protein may be read as, respectively, the copy number and the number of kinds of the objective protein.

In the microorganism as described herein, the genetic construct for expression of the objective protein may be present on a vector autonomously replicable outside of the chromosome such as a plasmid, or may have been introduced into the chromosome. That is, the microorganism may have the genetic construct for expression of the objective protein on a vector, and in other words, may have a vector containing the genetic construct for expression of the objective protein. Also, the microorganism may have the genetic construct for expression of the objective protein on the chromosome. When the microorganism has two or more genetic constructs for expression of the objective protein, it is sufficient that those genetic constructs are possessed by the microorganism so that the objective protein can be produced. For example, all of those genetic constructs may be carried by a single expression vector, or may be carried by the chromosome. Alternatively, those genetic constructs may be separately carried by a plurality of expression vectors, or may be separately carried by a single or a plurality of expression vectors and the chromosome.

The microorganism as described herein may be a microorganism inherently having a genetic construct for expression of the objective protein, or may be a microorganism modified so as to have a genetic construct for expression of the objective protein. The microorganism can typically be a microorganism inherently having a genetic construct for expression of cellulase. The microorganism as described herein may also be a microorganism into which a genetic construct for expression of the objective protein has been introduced, in addition to or instead of a genetic construct for expression of the objective protein inherently possessed by the microorganism. The microorganism having a genetic construct for expression of the objective protein can be obtained by introducing the genetic construct for expression of the objective protein into such *Talaromyces cellulolyticus* as mentioned above.

The phrase "a genetic construct for expression of an objective protein" refers to a gene expression system configured to be able to express an objective protein. The genetic construct for expression of the objective protein can also be referred to as an "expression system for an objective protein" or an "expression unit for an objective protein". The genetic construct for expression of the objective protein includes, in the direction from 5' to 3', a promoter sequence and a nucleotide sequence encoding the objective protein. A promoter sequence can also be referred to simply as a "promoter". A nucleotide sequence encoding an amino acid sequence is also referred to as a "gene". For example, a nucleotide sequence encoding the objective protein is also referred to as a "gene encoding an objective protein" or an "objective protein gene". It is sufficient that the objective protein gene is ligated downstream from the promoter so that the objective protein is expressed under the control of the promoter. The genetic construct for expression of the objective protein may also include a regulatory sequence effective for expression of the objective protein, such as an operator and a terminator, at an appropriate position so that it can function. The phrases "expression of an objective protein gene", "expression of an objective protein", "generation of an objective protein", and "production of an objective protein" can be used synonymously to each other, unless otherwise stated. The genetic construct for expression of the objective protein can be appropriately designed according to various conditions such as the type of objective protein.

The promoter is not particularly limited so long as it functions in *Talaromyces cellulolyticus*. The phrase "a promoter that functions in *Talaromyces cellulolyticus*" refers to a promoter having a promoter activity, i.e. a gene transcription activity, in *Talaromyces cellulolyticus*.

The promoter may be a promoter derived from the host, or may be a heterologous promoter. The promoter may be the native promoter of the objective protein gene, or may be a promoter of another gene. The promoter may be an inducible promoter or may be a constitutive promoter. Examples of the promoter include promoters of cellulase genes of microorganisms. Specific examples of the promoter include promoters of cellulase genes of *Talaromyces cellulolyticus*. Examples of the cellulase genes include a cbhI gene (also referred to as cbh1 gene) and a cbhII gene (also referred to as cbh2 gene). That is, examples of the promoter include a promoter of the cbhI gene and a promoter of the cbhII gene. The promoter of the cbhI gene is also referred to as a "cbhI promoter" or a "cbh1 promoter". The promoter of the cbhII gene is also referred to as a "cbhII promoter" or a "cbh2 promoter". The nucleotide sequence of the cbhII promoter of *Talaromyces cellulolyticus* is shown in SEQ ID NO: 63. That is, the promoter may be, for example, a promoter having any of the nucleotide sequences of the promoters exemplified above, e.g. the nucleotide sequence of SEQ ID NO: 63. The promoter may also be, for example, a conservative variant of any of the promoters exemplified above, e.g. a conservative variant of the promoter having the nucleotide sequence of SEQ ID NO: 63. That is, for example, each of the promoters exemplified above can be used as it is, or after being modified as required. The phrases "cbhI promoter" and "cbhII promoter" include not only the cbhI and cbhII promoters exemplified above, but also include conservative variants thereof. The descriptions concerning conservative variants of the pep4 gene below can be applied similarly to conservative variants of the promoter. For example, the promoter may be a DNA having a nucleotide sequence having an identity of 80% or higher, 90% or higher, 95% or higher, 97% or higher, or 99% or higher, to the nucleotide sequence of SEQ ID NO: 63, so long as the original function is maintained. The term "original function" used for the promoter refers to a function of expressing, e.g. inducibly or constitutively expressing, a gene ligated immediately downstream of the promoter. The function of the promoter can be confirmed by, for example, confirming an expression of a gene. The expression of a gene can be confirmed by, for example, using a reporter gene.

The objective protein is not particularly limited. The objective protein may be a protein derived from the host, or may be a heterologous protein. In the present invention, the phrase "heterologous protein" refers to an exogenous protein relative to *Talaromyces cellulolyticus* that produces the protein. The objective protein may be, for example, a protein derived from a microorganism, a protein derived from a plant, a protein derived from an animal, a protein derived from a virus, or a protein of which the amino acid sequence is artificially designed. The objective protein may particularly be a derived from human. The objective protein may be a monomeric protein or a multimeric protein. The term "multimeric protein" refers to a protein that may exist as a multimer that includes two or more subunits. In the multimer, the subunits may be linked by covalent bonds such as disulfide bonds, linked by non-covalent bonds such as hydrogen bonds and hydrophobic interaction, or linked by a combination thereof. The multimer can include one or more intermolecular disulfide bonds. The multimer may be a homo-multimer including a single kind of subunit, or may be a hetero-multimer that includes two or more kinds of subunits. The phrase "an objective protein is a heterologous protein" may mean that, when the objective protein is a hetero-multimer, at least one subunit of the hetero-multimer is a heterologous protein. That is, all the subunits may be heterologous, or only a part of the subunits may be heterologous. The objective protein may be a secretory protein or a non-secretory protein. Although the objective protein may be a secretory protein in nature, or may be a non-secretory protein in nature, it is preferred that the objective protein is a secretory protein in nature. The phrase "protein" also includes substances called peptide, such as oligopeptides and polypeptides.

Examples of the objective protein include, for example, enzymes, physiologically active proteins, receptor proteins, antigenic proteins, and any other proteins.

Examples of the enzymes include, for example, cellulase, xylanase, transglutaminase, protein glutaminase, protein asparaginase, isomaltodextranase, protease, endopeptidase, exopeptidase, aminopeptidase, carboxypeptidase, collagenase, chitinase, gamma-glutamylvaline synthase, glutamate-cysteine ligase, glutathione synthetase, and so forth.

The phrase "cellulase" collectively refers to enzymes catalyzing a reaction of hydrolyzing a glycoside bond contained in cellulose. Examples of cellulase include endo-type cellulase (endoglucanase; EC 3.2.1.4), exo-type cellulase (cellobiohydrolase; EC 3.2.1.91), and cellobiase (beta-glucosidase; EC 3.2.1.21). Cellulase is also referred to as Avicelase, filter paper cellulase (FPase), carboxymethylcellulase (CMCase), or the like depending on the substrate used for activity measurement. Examples of cellulase include, for example, cellulases of fungi such as *Trichoderma reesei* and *Talaromyces cellulolyticus* and cellulases of bacteria such as *Clostridium thermocellum*.

Examples of transglutaminase include, for example, secretory-type transglutaminases of Actinomycetes such as *Streptoverticillium mobaraense* IFO 13819 (WO01/23591), *Streptoverticillium cinnamoneum* IFO 12852, *Streptoverticillium griseocarneum* IFO 12776, and *Streptomyces lydicus* (WO96/06931), and of filamentous fungi such as Oomycetes (WO92/22366). Examples of protein glutaminase include, for example, protein glutaminase of *Chryseobacterium proteolyticum* (WO2005/103278). Examples of isomaltodextranase include, for example, isomaltodextranase of *Arthrobacter globiformis* (WO2005/103278).

Examples of the physiologically active proteins include, for example, growth factors, hormones, cytokines, and antibody-related molecules.

Specific examples of the growth factors include, for example, epidermal growth factor (EGF), insulin-like growth factor-1 (IGF-1), transforming growth factor (TGF), nerve growth factor (NGF), brain-derived neurotrophic factor (BDNF), vascular endothelial growth factor (VEGF), granulocyte-colony stimulating factor (G-CSF), granulocyte-macrophage-colony stimulating factor (GM-CSF), platelet-derived growth factor (PDGF), erythropoietin (EPO), thrombopoietin (TPO), acidic fibroblast growth factor (aFGF or FGF1), basic fibroblast growth factor (bFGF or FGF2), keratinocyte growth factor (KGF-1 or FGF7, and, KGF-2 or FGF10), hepatocyte growth factor (HGF), stem cell factor (SCF), and activin. Examples of the activin include activins A, C, and E.

Specific examples of the hormones include, for example, insulin, glucagon, somatostatin, human growth hormone (hGH), parathyroid hormone (PTH), calcitonin, and exenatide.

Specific examples of the cytokines include, for example, interleukins, interferons, and tumor necrosis factors (TNFs).

The growth factors, hormones, and cytokines may not be strictly distinguished from one another. For example, a physiologically active protein may be a protein belonging to a single group selected from growth factors, hormones, and cytokines, or may be a protein belonging to a plurality of groups selected from those.

Furthermore, a physiologically active protein may be an intact protein, or may be a part of a protein. Examples of a part of a protein include, for example, a part having physiological activity. Specific examples of a part having physiological activity include, for example, Teriparatide, a physiologically active peptide consisting of the N-terminal 34 amino acid residues of parathyroid hormone (PTH).

The phrase "antibody-related molecule" refers to a protein containing a molecular species having a single domain or a combination of two or more domains of a complete antibody. Examples of the domains constituting a complete antibody include heavy chain domains VH, CH1, CH2, and CH3, and light chain domains VL and CL. The antibody-related molecule may be a monomeric protein, or may be a multimeric protein, so long as it contains the above-mentioned molecular species. When the antibody-related molecule is a multimeric protein, it may be a homo-multimer having a single kind of subunit, or may be a hetero-multimer having two or more kinds of subunits. Specific examples of the antibody-related molecules include, for example, complete antibody, Fab, F(ab'), F(ab')$_2$, Fc, dimer having a heavy chain (H chain) and a light chain (L chain), Fc-fusion protein, heavy chain (H chain), light chain (L chain), light chain Fv (scFv), sc(Fv)$_2$, disulfide-bonded Fv (sdFv), diabody, and VHH fragment (Nanobody (registered trademark)). More specific examples of the antibody-related molecules include, for example, Trastuzumab, Adalimumab, Nivolumab, and VHH antibody N15.

Examples of the receptor proteins include, for example, receptor proteins for physiologically active proteins and other physiologically active substances. Examples of the other physiologically active substances include, for example, neurotransmitters such as dopamine. Furthermore, a receptor protein may be an orphan receptor of which the corresponding ligand is not known.

The antigenic proteins are not particularly limited, so long as they are proteins that can induce an immune response. An antigen protein can be appropriately selected, for example, depending on the intended object of the immune response. An antigen protein can be used, for example, as a vaccine.

In addition, examples of other proteins include Liver-type fatty acid-binding protein (LFABP), fluorescent protein, immunoglobulin-binding protein, albumin, fibroin-like protein, and extracellular protein. Examples of the fluorescent protein include green fluorescent protein (GFP) and monomeric red fluorescent protein (mRFP). Examples of the immunoglobulin-binding protein include Protein A, Protein G, and Protein L. Examples of the albumin include human serum albumin. Examples of the fibroin-like protein include those disclosed in WO2017/090665 and WO2017/171001.

Examples of the extracellular protein include fibronectin, vitronectin, collagen, osteopontin, laminin, and partial sequences thereof. Laminin is a protein having a heterotrimeric structure having an α chain, a β chain, and a γ chain. Examples of laminin include laminin of mammals. Examples of the mammals include primates such as human, monkey, and chimpanzee; rodents such as mouse, rat, hamster, and guinea pig; and other various mammals such as rabbit, horse, cattle, sheep, goat, pig, dog, and cat. Particular examples of the mammals include human. Examples of the subunit chains of laminin (i.e. α, β, and γ chains) include 5 kinds of α chains (α1 to α5), 3 kinds of β chains (β1 to β3), and 3 kinds of γ chains (γ1 to γ3). Laminin constitutes various isoforms depending on combinations of these subunits. Specific examples of laminin include, for example, laminin 111, laminin 121, laminin 211, laminin 213, laminin 221, laminin 311, laminin 321, laminin 332, laminin 411, laminin 421, laminin 423, laminin 511, laminin 521, and laminin 523. Examples of the partial sequence of laminin include laminin E8, which is an E8 fragment of laminin. Laminin E8 is a protein having a heterotrimeric structure consisting of an E8 fragment of α chain (α chain E8), an E8 fragment of β chain (β chain E8), and an E8 fragment of γ chain (γ chain E8). The subunit chains of laminin E8 (i.e. α chain E8, β chain E8, and γ chain E8) are also collectively referred to as "E8 subunit chains". Examples of the E8 subunit chains include E8 fragments of the laminin subunit chains exemplified above. Laminin E8 constitutes various isoforms depending on combinations of these E8 subunit chains. Specific examples of laminin E8 include, for example, laminin 111E8, laminin 121E8, laminin 211E8, laminin 221E8, laminin 332E8, laminin 421E8, laminin 411E8, laminin 511E8, and laminin 521E8.

The objective protein gene can be used as it is, or after being modified as required. The objective protein gene can be modified, for example, for obtaining a desired activity. The descriptions concerning conservative variants of the pep4 gene and the Pep4 protein below can be applied similarly to variants of the objective protein gene and the objective protein. For example, the objective protein gene may be modified so that the amino acid sequence of the encoded objective protein includes substitution, deletion, insertion, and/or addition of one or several amino acid residues. A protein specified with the type of organism from which the protein is derived is not limited to proteins per se found in that organism, and shall also include proteins having any of the amino acid sequences of proteins found in that organism and variants thereof. That is, for example, the term "protein derived from human" is not limited to proteins per se found in human, and shall also include proteins having any of the amino acid sequences of proteins found in human and variants thereof. Furthermore, in the objective protein gene, any codon(s) may be replaced with respective equivalent codon(s) thereof. For example, the objective protein gene may be modified so that it has optimal codons according to codon frequencies in the host to be used.

The objective protein may have another amino acid sequence in addition to such an amino acid sequence of the objective protein as exemplified above. That is, the objective protein may be a fusion protein with another amino acid sequence. The "another amino acid sequence" is not particularly limited, so long as an objective protein having a desired characteristic can be obtained. The "another amino acid sequence" can be appropriately selected depending on various conditions such as use purpose thereof. Examples of the "another amino acid sequence" include, for example, a signal peptide (also referred to as "signal sequence"), a peptide tag, and a recognition sequence of a protease. The "another amino acid sequence" may be bound to, for example, either one or both of the N-terminus and C-terminus of the objective protein. As the "another amino acid sequence", one kind of amino acid sequence may be used, or two or more kinds of amino acid sequences may be used in combination.

The signal peptide can be used for, for example, secretory production of the objective protein. The signal peptide may be bound to the N-terminus of the objective protein. That is, in an embodiment, the fusion protein construct may include, in the direction from 5' to 3', a promoter sequence, a nucleotide sequence encoding the signal peptide, and a nucleotide sequence encoding the objective protein. In this case, it is sufficient that the nucleotide sequence encoding the objective protein is ligated downstream from the nucleotide sequence encoding the signal peptide so that the objective protein is expressed as a fusion protein with the signal peptide. In such a fusion protein, the signal peptide and the objective protein may be or may not be adjacent to each other. That is, the phrase "an objective protein is expressed as a fusion protein with a signal peptide" includes not only when an objective protein is expressed as a fusion protein with a signal peptide in which the signal peptide and the objective protein are adjacent to each other, but also includes when an objective protein is expressed as a fusion protein in which the signal peptide and the objective protein are fused with each other via another amino acid sequence. When producing an objective protein by secretory production using a signal peptide, typically, the signal peptide may be cleaved at the time of secretion, and the objective protein not having the signal peptide may be secreted outside microbial cells. That is, the phrase "an objective protein is expressed as a fusion protein with a signal peptide" or the phrase "an objective protein comprise a signal peptide" means that it is sufficient that the objective protein constitutes a fusion protein with a signal peptide at the time of expression, and it does not necessarily mean that the eventually-obtained objective protein constitutes a fusion protein with a signal peptide.

The signal peptide is not particularly limited so long as it functions in *Talaromyces cellulolyticus*. The phrase "a signal peptide that functions in *Talaromyces cellulolyticus*" refers to a signal peptide providing secretion of the objective protein when the signal peptide is ligated to the N-terminus of the objective protein.

The signal peptide may be a signal peptide derived from the host, or may be a heterologous signal peptide. The signal peptide may be the native signal peptide of the objective protein, or may be a signal peptide of another protein. Examples of the signal peptide include signal peptides of secretory cellulases of microorganisms. Specific examples of the signal peptide include signal peptides of secretory cellulases of *Talaromyces cellulolyticus*. Examples of the secretory cellulases include a CbhI protein encoded by a cbhI gene (also referred to as CbhI protein) and a CbhII protein encoded by a cbhII gene (also referred to as Cbh2 protein). That is, examples of the signal peptide include a signal peptide of the CbhI protein and a signal peptide of the CbhII protein. The signal peptide of the CbhI protein is also referred to as a "CbhI signal peptide" or a "CbhI signal peptide". The signal peptide of the CbhII protein is also referred to as a "CbhII signal peptide" or a "Cbh2 signal peptide". The amino acid sequence of the CbhI signal peptide of *Talaromyces cellulolyticus* is shown in SEQ ID NO: 72. That is, the signal peptide may be, for example, a signal peptide having any of the amino acid sequences of the signal peptides exemplified above, e.g. the amino acid sequence of SEQ ID NO: 72. The signal peptide may also be, for example, a conservative variant of any of the signal peptides exemplified above, e.g. a conservative variant of the signal peptide having the amino acid sequence of SEQ ID NO: 72. That is, for example, each of the signal peptides exemplified above can be used as it is, or after being modified as required. The phrases "CbhI signal peptide" and "CbhII signal peptide" include not only the CbhI and CbhII signal peptides exemplified above, but also include conservative variants thereof. The descriptions concerning conservative variants of the Pep4 protein below can be applied similarly to conservative variants of the signal peptide. For example, the signal peptide may be a peptide having the amino acid sequence of SEQ ID NO: 72, but which includes substitution, deletion, insertion, and/or addition of one or several amino acid residues at one or several positions, so long as the original function is maintained. The term "one or several" mentioned above in the variant of the signal peptide is, specifically, for example, 1 to 7, 1 to 5, 1 to 3, or 1 to 2. For example, the signal peptide may also be a peptide having an amino acid sequence having an identity of 80% or higher, 90% or higher, 95% or higher, 97% or higher, or 99% or higher, to the amino acid sequence of SEQ ID NO: 72, so long as the original function is maintained. The term "original function" used for the signal peptide refers to a function of providing secretion of the objective protein when the signal peptide is ligated to the N-terminus of the objective protein. The function of the signal peptide can be confirmed by, for example, confirming secretion of a protein due to ligation of the signal peptide to the N-terminus of the protein.

Specific examples of the peptide tag include His tag, FLAG tag, GST tag, Myc tag, MBP (maltose binding protein), CBP (cellulose binding protein), TRX (thioredoxin), GFP (green fluorescent protein), HRP (horseradish peroxidase), ALP (alkaline phosphatase), and Fc region of antibody. The peptide tag can be utilized for, for example, detection and purification of the expressed objective protein.

Specific examples of the recognition sequence of a protease include the recognition sequence of the HRV3C protease, the recognition sequence of the Factor Xa protease, and the recognition sequence of the proTEV protease. The recognition sequence of a protease can be used for, for example, cleavage of the expressed objective protein. Specifically, for example, when the objective protein is expressed as a fusion protein with a peptide tag, if a recognition sequence of a protease is introduced into the connection part of the objective protein and the peptide tag, the peptide tag can be cleaved from the expressed objective protein by using a protease to obtain the objective protein not having the peptide tag.

The N-terminal region of the eventually-obtained objective protein may be the same as that of the natural protein, or may not be the same as that of the natural protein. For example, the N-terminal region of the eventually-obtained objective protein may be that of the natural protein including addition or deletion of one or several amino acid residues. Although the number of the "one or several" amino acid residues may differ depending on the full length or structure of the objective protein, specifically, it is 1 to 20, 1 to 10, 1 to 5, or 1 to 3.

Furthermore, the objective protein may also be expressed as a protein having a pro-structure moiety (proprotein). When the objective protein is expressed as a proprotein, the eventually-obtained objective protein may be or may not be the proprotein. That is, the proprotein may be processed into the mature protein by cleavage of the pro-structure moiety. The cleavage can be attained with, for example, a protease. When a protease is used, generally, the proprotein can be cleaved at a position substantially the same as that of the natural protein, or even at exactly the same position as that of the natural protein so that the same mature protein as the natural mature protein is obtained, in view of the activity of the eventually-obtained protein. Therefore, generally, a specific protease that cleaves the proprotein at such a position that the same protein as the naturally occurring mature protein is generated is most preferred. However, the N-terminal region of the eventually-obtained objective protein may not be the same as that of the natural protein as described above. For example, depending on type, purpose of use etc. of the objective protein to be produced, a protein having an N-terminus longer or shorter by one to several amino acid residues compared with the natural protein may have more appropriate activity. Proteases usable include, for example, commercially available proteases such as Dispase (produced by Boehringer Mannheim) as well as those obtainable from culture broth of a microorganism such as culture broth of actinomycetes. Such proteases may be used in an un-purified state, or may be used after purification to an appropriate purity as required.

The objective protein gene can be obtained by, for example, cloning. For cloning, for example, nucleotides, such as genomic DNA and cDNA, containing the objective protein gene can be used. Furthermore, the objective protein gene can also be obtained by, for example, total synthesis based on the nucleotide sequence thereof (Gene, 60(1), 115-127 (1987)). The obtained objective protein gene can be used as it is, or after being modified as required. That is, a variant of an objective protein gene may be obtained by modifying the objective protein gene. A gene can be modified by a known technique. For example, an objective mutation can be introduced into an objective site of DNA by the site-specific mutation method. Examples of the site-specific mutation method include the method utilizing PCR (Higuchi, R., 61, in PCR Technology, Erlich, H. A. Eds., Stockton Press (1989); Carter, P., Meth. in Enzymol., 154, 382 (1987)), and the method utilizing phage (Kramer, W. and Frits, H. J., Meth. in Enzymol., 154, 350 (1987); Kunkel, T. A. et al., Meth. in Enzymol., 154, 367 (1987)). Alternatively, a variant of an objective protein gene may be totally synthesized. Furthermore, the obtained objective protein gene can be subject to modification such as introduction of a promoter sequence as required, to thereby obtain the genetic construct for expression of the objective protein. Incidentally, other elements of the genetic construct for expression of the objective protein, such as a promoter sequence, and the genetic construct for expression of the objective protein can be obtained in a similar manner to that for obtaining the objective protein gene.

Genes can be modified by known methods. For example, an objective mutation can be introduced into a target site of DNA by the site-specific mutagenesis method. Examples of the site-specific mutagenesis method include a method of using PCR (Higuchi, R., 61, in PCR Technology, Erlich, H. A. Eds., Stockton Press (1989); Carter P., Meth. In Enzymol., 154, 382 (1987)), and a method of using a phage (Kramer, W. and Frits, H. J., Meth. in Enzymol., 154, 350 (1987); Kunkel, T. A. et al., Meth. in Enzymol., 154, 367 (1987)).

Methods for introducing the genetic construct for expression of the objective protein into *Talaromyces cellulolyticus* are not particularly limited. The phrase "introduction of a genetic construct for expression of an objective protein" refers to making a host harbor the genetic construct, and may specifically refer to introducing an objective protein gene into a host so that the can be expressed. The phrase "introduction of a genetic construct for expression of an objective protein" includes not only cases where the genetic construct for expression of the objective protein that has been preliminarily constructed is introduced into a host at once, but also includes cases where a part of the genetic construct for expression of the objective protein is introduced into a host and the genetic construct for expression of the objective protein is constructed in the host, unless otherwise stated. For example, an objective protein gene may be introduced downstream a promoter inherently possessed by a host to thereby construct the genetic construct for expression of the objective protein on the chromosome of the host.

The genetic construct for expression of the objective protein can be introduced into a host by using, for example, a vector containing the genetic construct for expression of the objective protein. A vector containing the genetic construct for expression of the objective protein is also referred to as an "expression vector of an objective protein". The vector containing the genetic construct for expression of the objective protein can be constructed by, for example, ligating the genetic construct for expression of the objective protein with a vector. Also, for example, when a vector contains a promoter, the vector containing the genetic construct for expression of the objective protein can also be constructed by ligating an objective protein gene downstream the promoter. By introducing an expression vector of the objective protein, a transformant transformed with the vector can be obtained, and that is, the genetic construct for expression of the objective protein can be introduced into the host. The vector is not particularly limited so long as it is autonomously replicable in cells of the host. The vector may be a single copy vector, a low copy vector, or a high copy vector. The vector may contain a marker gene for selection of transformants. The vector may contain a promoter and a terminator for expressing the introduced gene.

Furthermore, the genetic construct for expression of the objective protein may be introduced into the chromosome of a host. Introduction of a gene into the chromosome can be carried out by homologous recombination. Specifically, the genetic construct for expression of the objective protein can be introduced into the chromosome of a host by transforming the host with a recombinant DNA containing the genetic construct to thereby induce homologous recombination between the genetic construct and a target region of the chromosome of the host. The structure of the recombinant DNA to be used for homologous recombination is not particularly limited as long as it causes homologous recombination in a desired manner. For example, a host can be transformed with a linear DNA containing the genetic construct for expression of the objective protein and further containing upstream and downstream sequences of the substitution target region on the chromosome at the respective ends, so that homologous recombination occurs at each of upstream and downstream sides of the target region, to thereby replace the target region with the genetic construct. The recombinant DNA to be used for homologous recombination may contain a marker gene for selection of transformants. Incidentally, introduction of a part of the genetic construct for expression of the objective protein, such as an objective protein gene and a promoter, into the chromosome can be carried out in a similar manner to that for introduction of the whole of the genetic construct for expression of the objective protein into the chromosome.

The marker gene can be appropriately selected according to the phenotype such as auxotrophy of the host. For example, when the host shows uracil auxotrophy due to mutation in a pyrF or pyrG gene, a strain introduced with a desired modification can be selected by using a pyrF or pyrG gene as a marker gene and using complementation of uracil auxotrophy, i.e. using uracil prototroph, as an indicator. Furthermore, as the marker gene, a drug resistance gene such as hygromycin resistance gene can be used.

Transformation can be carried out by, for example, a method generally used for transformation of eukaryotic microorganisms such fungi and yeasts. Examples of such a method include the protoplast method.

<1-3> Reduction in Activity of Pep4 Protein

The microorganism as described herein has been modified so that the activity of a Pep4 protein is reduced. The microorganism has been modified so that, specifically, the activity of the Pep4 protein is reduced as compared with a non-modified strain. The microorganism may have been modified so that, more specifically, for example, the expression of the pep4 gene is reduced or the pep4 gene is disrupted. By modifying *Talaromyces cellulolyticus* so that the activity of the Pep4 protein is reduced, the objective protein-producing ability of *Talaromyces cellulolyticus* can be improved, and that is, production of the objective protein by *Talaromyces cellulolyticus* can be increased.

Hereinafter, the Pep4 protein and the pep4 gene encoding the same will be explained.

The Pep4 protein is a protease. The phrase "protease" refers to a protein having an activity of catalyzing a reaction of hydrolyzing a protein. This activity is also referred to as a "protease activity".

The pep4 gene (including introns) of *Talaromyces cellulolyticus* strain Y-94 (FERM BP-5826, CBS 136886) corresponds to the complementary sequence of positions 2810881 to 2812244 of the genomic sequence registered as NCBI ACCESSION DF933830.1 in NCBI. The Pep4 protein of *Talaromyces cellulolyticus* strain Y-94 has been registered as NCBI ACCESSION GAM39722.1 in NCBI. The nucleotide sequence of the pep4 gene (including introns) of *Talaromyces cellulolyticus* strain Y-94 is shown as SEQ ID NO: 70, and the amino acid sequence of the Pep4 protein encoded by this gene is shown as SEQ ID NO: 71. That is, the pep4 gene may be, for example, a gene having the nucleotide sequence shown as SEQ ID NO: 70. Also, the Pep4 protein may be, for example, a protein having the amino acid sequence shown as SEQ ID NO: 71. The expression "a gene or protein has a nucleotide or amino acid sequence" may mean that the gene or protein includes the nucleotide or amino acid sequence unless otherwise stated, and may also include when the gene or protein has only the nucleotide or amino acid sequence.

The pep4 gene may be a variant of any of the pep4 genes exemplified above (such as a gene having the nucleotide sequence shown as SEQ ID NO: 70), so long as the original function thereof is maintained. Similarly, the Pep4 protein may be a variant of any of the Pep4 proteins exemplified above (such as a protein having the amino acid sequence shown as SEQ ID NO: 71), so long as the original function thereof is maintained. Such a variant is also referred to as "conservative variant". The term "pep4 gene" includes not only the pep4 genes exemplified above, but also includes conservative variants thereof. Similarly, the term "Pep4 protein" includes not only the Pep4 proteins exemplified above, but also includes conservative variants thereof. Examples of the conservative variants include, for example, homologues and artificially modified versions of the pep4 genes and Pep4 proteins exemplified above.

The expression "the original function is maintained" means that a variant of a gene or protein has a function (such as activity or property) corresponding to the function (such as activity or property) of the original gene or protein. That is, the expression "the original function is maintained" used for the pep4 gene means that a variant of the gene encodes a protein that maintains the original function. Furthermore, the expression "the original function is maintained" used for the Pep4 protein means that a variant of the protein has the protease activity.

The protease activity can be measured by incubating the enzyme with a substrate (a protein), and measuring the enzyme-dependent degradation of the substrate. The protease activity can also be measured by using a commercial kit for measuring the protease activity.

Hereinafter, examples of the conservative variants will be explained.

Homologues of the pep4 genes and homologues of the Pep4 proteins can be easily obtained from public databases by, for example, BLAST search or FASTA search using any of the nucleotide sequences of the pep4 genes exemplified above or any of the amino acid sequences of the Pep4 proteins exemplified above as a query sequence. Furthermore, homologues of the pep4 genes can be obtained by, for example, PCR using a chromosome of organisms such as *Talaromyces cellulolyticus* as the template, and oligonucleotides prepared on the basis of any of the nucleotide sequences of these known pep4 genes as primers.

The pep4 gene may be a gene encoding a protein having any of the amino acid sequences of the Pep4 proteins exemplified above (such as the amino acid sequence shown as SEQ ID NO: 71), but which includes substitution, deletion, insertion, and/or addition of one or several amino acid residues at one or several positions, so long as the original function thereof is maintained. Although the number meant by the term "one or several" mentioned above may differ depending on the positions of amino acid residues in the three-dimensional structure of the protein or the types of amino acid residues, specifically, it is, for example, 1 to 50, 1 to 40, 1 to 30, 1 to 20, 1 to 10, 1 to 5, or 1 to 3.

The aforementioned substitution, deletion, insertion, and/or addition of one or several amino acid residues is a conservative mutation that maintains the normal function of the protein. Typical examples of the conservative mutation are conservative substitutions. The conservative substitution is a mutation wherein substitution takes place mutually among Phe, Trp, and Tyr, if the substitution site is an aromatic amino acid; among Leu, Ile, and Val, if it is a hydrophobic amino acid; between Gln and Asn, if it is a polar amino acid; among Lys, Arg, and His, if it is a basic amino acid; between Asp and Glu, if it is an acidic amino acid; and between Ser and Thr, if it is an amino acid having a hydroxyl group. Examples of substitutions considered as conservative substitutions include, specifically, substitution of Ser or Thr for Ala, substitution of Gln, His, or Lys for Arg, substitution of Glu, Gln, Lys, His, or Asp for Asn, substitution of Asn, Glu, or Gln for Asp, substitution of Ser or Ala for Cys, substitution of Asn, Glu, Lys, His, Asp, or Arg for Gln, substitution of Gly, Asn, Gln, Lys, or Asp for Glu, substitution of Pro for Gly, substitution of Asn, Lys, Gln, Arg, or Tyr for His, substitution of Leu, Met, Val, or Phe for Ile, substitution of Ile, Met, Val, or Phe for Leu, substitution of Asn, Glu, Gln, His, or Arg for Lys, substitution of Ile, Leu, Val, or Phe for Met, substitution of Trp, Tyr, Met, Ile, or Leu for Phe, substitution of Thr or Ala for Ser, substitution of Ser or Ala for Thr, substitution of Phe or Tyr for Trp, substitution of His, Phe, or Trp for Tyr, and substitution of Met, Ile, or Leu for Val. Furthermore, such substitution, deletion, insertion, or addition of amino acid residues as mentioned above includes a naturally occurring mutation due to an individual difference, or a difference of species of the organism from which the gene is derived (mutant or variant).

The pep4 gene may also be a gene encoding a protein having an amino acid sequence having an identity of, for example, 80% or more, 90% or more, 95% or more, 97% or more, or 99% or more, to the total amino acid sequence of any of the amino acid sequences of the Pep4 proteins exemplified above (such as the amino acid sequence shown as SEQ ID NO: 71), so long as the original function thereof is maintained.

The pep4 gene may also be DNA that is able to hybridize under stringent conditions with a complementary sequence of any of the nucleotide sequences of the pep4 genes exemplified above (such as the nucleotide sequence shown as SEQ ID NO: 70), or with a probe that can be prepared from the complementary sequence, so long as the original function thereof is maintained. The term "stringent conditions" refers to conditions under which a so-called specific hybrid is formed, and a non-specific hybrid is not formed. Examples of the stringent conditions include those under which highly identical DNAs hybridize to each other, for example, DNAs not less than 80% identical, not less than 90% identical, not less than 95% identical, not less than 97% identical, or not less than 99% identical, hybridize to each other, and DNAs less identical than the above do not hybridize to each other, or conditions of washing of typical Southern hybridization, i.e., conditions of washing once, or 2 or 3 times, at a salt concentration and temperature corresponding to 1×SSC, 0.1% SDS at 60° C.; 0.1×SSC, 0.1% SDS at 60° C.; or 0.1×SSC, 0.1% SDS at 68° C.

The probe may be, for example, a part of a sequence that is complementary to the gene as described above. Such a probe can be prepared by PCR using oligonucleotides prepared on the basis of the nucleotide sequences of known genes as primers and a DNA fragment containing any of these nucleotide sequences as a template. As the probe, for example, a DNA fragment having a length of about 300 bp can be used. In such a case, the washing conditions of the hybridization may be, for example, 50° C., 2×SSC and 0.1% SDS.

Furthermore, the pep4 gene may be a gene in which any codon(s) is/are replaced with respective equivalent codon(s). That is, the pep4 gene may be a variant of any of the pep4 genes exemplified above due to the degeneracy of the genetic code.

The term "identity" between amino acid sequences means an identity between the amino acid sequences calculated by blastp with default scoring parameters (i.e. Matrix, BLO- SUM62; Gap Costs, Existence=11, Extension=1; Compositional Adjustments, Conditional compositional score matrix adjustment). The term "identity" between nucleotide sequences means an identity between the nucleotide sequences calculated by blastn with default scoring parameters (i.e. Match/Mismatch Scores=1, −2; Gap Costs=Linear).

The aforementioned descriptions concerning variants of the genes and proteins can also be applied similarly to any proteins such as the objective protein, and genes encoding them.

<1-4> Other Characteristics

The microorganism as described herein may have another desired characteristic, such as modification, so long as the objective protein-producing ability is not spoiled. Examples of the modification include modification for improving the objective protein-producing ability of *Talaromyces cellulolyticus*. Specific examples of the modification include modification of reducing the activity of a YscB protein and modification of reducing the activity of a CreA protein. These characteristics and modifications can be used solely or in any appropriate combination.

That is, the microorganism may have been modified so that, for example, the activity of a YscB protein is reduced. The microorganism may have been modified so that, specifically, the activity of the YscB protein is reduced as compared with a non-modified strain. The microorganism may have been modified so that, more specifically, for example, the expression of a yscB gene is reduced or a yscB gene is disrupted. The YscB protein is a protease.

The nucleotide sequence of the yscB gene (including introns) of *Talaromyces cellulolyticus* strain 56-25 is shown as SEQ ID NO: 60, and the amino acid sequence of the YscB protein encoded by this gene is shown as SEQ ID NO: 73. That is, the yscB gene may be, for example, a gene having the nucleotide sequence shown as SEQ ID NO: 60. Also, the YscB protein may be, for example, a protein having the amino acid sequence shown as SEQ ID NO: 73. The yscB gene and the YscB protein may be a conservative variant of the yscB gene and YscB protein exemplified above, respectively. The descriptions concerning conservative variants of the pep4 gene and the Pep4 protein can be applied similarly to conservative variants of the yscB gene and the YscB protein. Incidentally, the expression "the original function is maintained" used for the YscB protein means that a variant of the protein has the protease activity. The protease activity can be measured, for example, as described above.

Also, the microorganism as described herein may have been modified so that, for example, the activity of a CreA protein is reduced. The microorganism may have been modified so that, specifically, the activity of the CreA protein is reduced as compared with a non-modified strain. The microorganism may have been modified so that, more specifically, for example, the expression of a creA gene is reduced or a creA gene is disrupted. The creA gene is a gene encoding a transcription factor involved in catabolite repression. The creA gene is known to be involved in the expression of cellulase (Mol Gen Genet. 1996 Jun. 24; 251(4): 451-60, Biosci Biotechnol Biochem. 1998 December; 62(12):2364-70) in filamentous fungi.

The nucleotide sequence of the creA gene of *Talaromyces cellulolyticus* strain S6-25 is shown as SEQ ID NO: 74. That is, the creA gene may be, for example, a gene having the nucleotide sequence shown as SEQ ID NO: 74. Also, the CreA protein may be, for example, a protein having the amino acid sequence encoded by the nucleotide sequence shown as SEQ ID NO: 74. The creA gene and the CreA protein may be a conservative variant of the creA gene and CreA protein exemplified above, respectively. The descriptions concerning conservative variants of the pep4 gene and the Pep4 protein can be applied similarly to conservative variants of the creA gene and the CreA protein. Incidentally, the expression "the original function is maintained" used for the CreA protein means that a variant of the protein has a function as a transcription factor involved in catabolite repression.

<1-5> Method for Reducing Activity of Protein

Hereinafter, methods for reducing the activity of a protein such as the Pep4 protein, YscB protein, and CreA protein will be described.

The expression "the activity of a protein is reduced" means that the activity of the protein is reduced as compared with a non-modified strain. Specifically, the expression "the activity of a protein is reduced" means that the activity of the protein per cell is reduced as compared with that of a non-modified strain. The term "non-modified strain" used herein refers to a control strain that has not been modified so that the activity of an objective protein is reduced. Examples of the non-modified strain include a wild-type strain and parent strain. Specific examples of the non-modified strain include strains exemplified above in relation to the description of *Talaromyces cellulolyticus*. That is, in an embodiment, the activity of a protein may be reduced as compared with *Talaromyces cellulolyticus* strain S6-25. The state that "the activity of a protein is reduced" also includes a state that the activity of the protein has completely disappeared. More specifically, the expression "the activity of a protein is reduced" may mean that the number of molecules of the protein per cell is reduced, and/or the function of each molecule of the protein is reduced as compared with those of a non-modified strain. That is, the term "activity" in the expression "the activity of a protein is reduced" is not limited to the catalytic activity of the protein, but may also mean the transcription amount of a gene (i.e. the amount of mRNA) encoding the protein or the translation amount of the gene (i.e. the amount of the protein). The term "the number of molecules of a protein per cell" may mean an average value of the number of molecules of the protein per cell. The state that "the number of molecules of the protein per cell is reduced" also includes a state that the protein does not exist at all. The state that "the function of each molecule of the protein is reduced" also includes a state that the function of each protein molecule has completely disappeared. The degree of the reduction in the activity of a protein is not particularly limited, so long as the activity is reduced as compared with that of a non-modified strain. The activity of a protein may be reduced to, for example, 50% or less, 20% or less, 10% or less, 5% or less, or 0% of that of a non-modified strain.

The modification for reducing the activity of a protein can be attained by, for example, reducing the expression of a gene encoding the protein. The expression "the expression of a gene is reduced" means that the expression of the gene is reduced as compared with a non-modified strain. Specifically, the expression "the expression of a gene is reduced" means that the expression amount of the gene per cell is reduced as compared with that of a non-modified strain. The term "the expression amount of a gene per cell" may mean an average value of the expression amount of the gene per cell. More specifically, the expression "the expression of a gene is reduced" may mean that the transcription amount of the gene (i.e. the amount of mRNA) is reduced, and/or the translation amount of the gene (i.e. the amount of the protein expressed from the gene) is reduced. The state that "the expression of a gene is reduced" also includes a state that the gene is not expressed at all. The state that "the expression of a gene is reduced" is also referred to as "the expression of a gene is attenuated". The expression of a gene may be reduced to, for example, 50% or less, 20% or less, 10% or less, 5% or less, or 0% of that of a non-modified strain.

The reduction in gene expression may be due to, for example, a reduction in the transcription efficiency, a reduction in the translation efficiency, or a combination of them. The expression of a gene can be reduced by modifying an expression control sequence of the gene. The term "expression control sequence" collectively refers to sites that affect the expression of a gene, such as a promoter. Expression control sequences can be identified by, for example, using a promoter search vector or gene analysis software such as GENETYX. When an expression control sequence is modified, one or more nucleotides, two or more nucleotides, or three or more nucleotides, of the expression control sequence are modified. The transcription efficiency of a gene can be reduced by, for example, replacing the promoter of the gene on a chromosome with a weaker promoter. The term "weaker promoter" means a promoter providing an attenuated transcription of a gene compared with an inherent wild-type promoter of the gene. Examples of weaker promoters include, for example, inducible promoters. That is, an inducible promoter may function as a weaker promoter under a non-induced condition, such as in the absence of the corresponding inducer. Furthermore, a partial region or the whole region of an expression control sequence may be deleted. The expression of a gene can also be reduced by, for example, manipulating a factor responsible for expression control. Examples of the factor responsible for expression control include low molecules responsible for transcription or translation control (inducers, inhibitors, etc.), proteins responsible for transcription or translation control (transcription factors etc.), nucleic acids responsible for transcription or translation control (siRNA etc.), and so forth. Furthermore, the expression of a gene can also be reduced by, for example, introducing a mutation that reduces the expression of the gene into the coding region of the gene. For example, the expression of a gene can be reduced by replacing a codon in the coding region of the gene with a synonymous codon used less frequently in a host. Furthermore, for example, the gene expression may be reduced due to disruption of a gene as described later.

The modification for reducing the activity of a protein can also be attained by, for example, disrupting a gene encoding the protein. The expression "a gene is disrupted" means that a gene is modified so that a protein that can normally function is not produced. The state that "a protein that normally functions is not produced" includes a state that the protein is not produced at all from the gene, and a state that the protein of which the function (such as activity or property) per molecule is reduced or eliminated is produced from the gene.

Disruption of a gene can be attained by, for example, deleting the gene on a chromosome. The term "deletion of a gene" refers to deletion of a partial or entire region of the coding region of the gene. Furthermore, the whole of a gene including sequences upstream and downstream from the coding region of the gene on a chromosome may be deleted. The sequences upstream and downstream from the coding region of the gene may include, for example, an expression control sequence of the gene. The region to be deleted may be any region such as an N-terminal region (region encoding an N-terminal region of a protein), an internal region, or a C-terminal region (region encoding a C-terminal region of a protein), so long as the activity of the protein can be reduced. Deletion of a longer region can usually more surely inactivate the gene. The region to be deleted may be, for example, a region having a length of 10% or more, 20% or more, 30% or more, 40% or more, 50% or more, 60% or more, 70% or more, 80% or more, 90% or more, or 95% or more of the total length of the coding region of the gene. Furthermore, it is preferred that reading frames of the sequences upstream and downstream from the region to be deleted are not the same. Inconsistency of reading frames may cause a frameshift downstream of the region to be deleted. In the case of the creA gene, specifically, for example, this gene can be disrupted by deleting a region corresponding to positions 3262 to 4509 of SEQ ID NO: 74 (Japanese Patent Laid-open (Kokai) No. 2016-131533).

Disruption of a gene can also be attained by, for example, introducing a mutation for an amino acid substitution (missense mutation), a stop codon (nonsense mutation), addition or deletion of one or two nucleotide residues (frame shift mutation), or the like into the coding region of the gene on a chromosome (Journal of Biological Chemistry, 272:8611-8617 (1997); Proceedings of the National Academy of Sciences, USA, 95 5511-5515 (1998); Journal of Biological Chemistry, 26 116, 20833-20839 (1991)).

Disruption of a gene can also be attained by, for example, inserting another nucleotide sequence into a coding region of the gene on a chromosome. Site of the insertion may be in any region of the gene, and insertion of a longer nucleotide sequence can usually more surely inactivate the gene. It is preferred that reading frames of the sequences upstream and downstream from the insertion site are not the same. Inconsistency of reading frames may cause a frameshift downstream of the region to be deleted. The other nucleotide sequence is not particularly limited so long as a sequence that reduces or eliminates the activity of the encoded protein is chosen, and examples thereof include, for example, marker genes and genes useful for production of the objective protein.

Particularly, disruption of a gene may be carried out so that the amino acid sequence of the encoded protein is deleted. In other words, the modification for reducing the activity of a protein can be attained by, for example, deleting the amino acid sequence (a partial or entire region of the amino acid sequence) of the protein, specifically, modifying a gene so as to encode a protein of which the amino acid sequence (a partial or entire region of the amino acid sequence) is deleted. The term "deletion of the amino acid sequence of a protein" refers to deletion of a partial or entire region of the amino acid sequence of the protein. In addition, the term "deletion of the amino acid sequence of a protein" means that the original amino acid sequence disappears in the protein, and also includes cases where the original amino acid sequence is changed to another amino acid sequence. That is, for example, a region that was changed to another amino acid sequence by frameshift may be regarded as a deleted region. When the amino acid sequence of a protein is deleted, the total length of the protein is typically shortened, but it is also possible that the total length of the protein is not changed or is extended. For example, by deletion of a partial or entire region of the coding region of a gene, a region encoded by the deleted region can be deleted in the encoded protein. In addition, for example, by introduction of a stop codon into the coding region of a gene, a region encoded by the downstream region of the introduction site can be deleted in the encoded protein. In addition, for example, by frameshift in the coding region of a gene, a region encoded by the frameshift region can be deleted in the encoded protein. The aforementioned descriptions concerning the position and length of the region to be deleted in deletion of a gene can be applied similarly to the position and length of the region to be deleted in deletion of the amino acid sequence of a protein.

Such modification of a gene on a chromosome as described above can be attained by, for example, preparing a disruption-type gene modified so that it is unable to produce a protein that normally functions, and transforming a host with a recombinant DNA containing the disruption-type gene to cause homologous recombination between the disruption-type gene and the wild-type gene on a chromosome and thereby substitute the disruption-type gene for the wild-type gene on the chromosome. In this procedure, if a marker gene selected according to the characteristics of the host such as auxotrophy is included in the recombinant DNA, the operation becomes easier. Examples of the disruption-type gene include a gene of which a partial or entire region of the coding region is deleted, gene including a missense mutation, gene including a nonsense mutation, gene including a frame shift mutation, and gene inserted with an insertion sequence such as a transposon or marker gene. The protein encoded by the disruption-type gene has a conformation different from that of the wild-type protein, even if it is produced, and thus the function thereof is reduced or eliminated.

The structure of the recombinant DNA to be used for homologous recombination is not particularly limited as long as it causes homologous recombination in a desired manner. For example, a host can be transformed with a linear DNA containing any chosen sequence and further containing upstream and downstream sequences of the substitution target region on the chromosome at the respective ends, so that homologous recombination occurs at each of upstream and downstream sides of the substitution target region, to thereby replace the substitution target region with the chosen sequence in one step. As such a chosen sequence, for example, a sequence containing a marker gene can be used.

The marker gene can be appropriately selected according to the phenotype such as auxotrophy of the host. For example, when the host shows uracil auxotrophy due to mutation in a pyrF or pyrG gene, a strain introduced with a desired modification can be selected by using a pyrF or pyrG gene as marker gene and using complementation of uracil auxotrophy, i.e. using uracil prototroph, as an indicator. Also, for example, when the host shows methionine auxotrophy due to mutation in a sC gene (sulfate permease gene), a strain introduced with a desired modification can be selected by using a sC gene as a marker gene and using complementation of methionine auxotrophy, i.e. using methionine prototroph, as an indicator. Furthermore, as the marker gene, a drug resistance gene such as hygromycin resistance gene can be used.

Modification for reducing activity of a protein can also be attained by, for example, a mutagenesis treatment. Examples of the mutagenesis treatment include irradiation of X-ray or ultraviolet and treatment with a mutation agent such as N-methyl-N'-nitro-N-nitrosoguanidine (MNNG), ethyl methanesulfonate (EMS), and methyl methanesulfonate (MMS).

A reduction in the activity of a protein can be confirmed by measuring the activity of the protein. The activity of the Pep4 protein and YscB protein can be measured, for example, as described above. The activity of the CreA protein can be measured by, for example, measuring the degree of catabolite repression. The degree of catabolite repression can be measured by, for example, measuring cellulase production under culture conditions containing glucose as a carbon source. That is, specifically, a reduction in the activity of the CreA protein can be confirmed, for example, on the basis of, as an indicator, improvement in cellulase production under culture conditions containing glucose as a carbon source.

A reduction in the activity of a protein can also be confirmed by confirming a reduction in the expression of a gene encoding the protein. A reduction in the expression of a gene can be confirmed by confirming a reduction in the transcription amount of the gene or a reduction in the amount of the protein expressed from the gene.

A reduction in the transcription amount of a gene can be confirmed by comparing the amount of mRNA transcribed from the gene with that of a non-modified strain. Examples of the method for evaluating the amount of mRNA include Northern hybridization, RT-PCR, and so forth (Molecular cloning (Cold Spring Harbor Laboratory Press, Cold Spring Harbor (USA), 2001)). The amount of mRNA (such as the number of molecules of the mRNA per cell) may be reduced to, for example, 50% or less, 20% or less, 10% or less, 5% or less, or 0% of that of a non-modified strain.

A reduction in the amount of a protein can be confirmed by Western blotting using antibodies (Molecular cloning (Cold Spring Harbor Laboratory Press, Cold Spring Harbor (USA) 2001)). The amount of the protein (such as the number of molecules of the protein per cell) may be reduced to, for example, 50% or less, 20% or less, 10% or less, 5% or less, or 0% of that of a non-modified strain.

Disruption of a gene can be confirmed by determining nucleotide sequence of a part or the whole of the gene, restriction enzyme map, full length, or the like of the gene depending on the means used for the disruption.

Transformation can be carried out by, for example, a method generally used for transformation of eukaryotic microorganisms such fungi and yeasts. Examples of such a method include the protoplast method.

<2> Method

By using the microorganism as described herein, the objective protein can be produced. Specifically, by culturing the microorganism, the objective protein can be produced. That is, the method as described herein may specifically be a method for producing the objective protein, including a step of culturing the microorganism as described herein in a culture medium.

The culture medium to be used is not particularly limited, so long as the microorganism can proliferate, and the objective protein is produced. As the culture medium, for example, a liquid culture medium containing a carbon source, nitrogen source, phosphate source, sulfur source, and ingredients selected from other various organic and inorganic ingredients as required can be used. The types and concentrations of the culture medium components can be appropriately chosen by those skilled in the art. Regarding specific culture medium compositions, for example, culture medium compositions disclosed in prior reports concerning *Talaromyces cellulolyticus* (Japanese Patent Laid-open (Kokai) No. 2003-135052, Japanese Patent Laid-open (Kokai) No. 2008-271826, Japanese Patent Laid-open (Kokai) No. 2008-271927, etc.) or culture medium compositions used for culturing other various cellulase-producing microorganisms such as *Trichoderma reesei* can be used as a reference.

The carbon source is not particularly limited, so long as the microorganism can utilize it and produce the objective protein. Examples of the carbon source include, for example, saccharides and cellulosic substrates. Specific examples of the saccharides include, for example, glucose, fructose, galactose, xylose, arabinose, sucrose, lactose, cellobiose, blackstrap molasses, hydrolysate of starch, and hydrolysate of biomass. Specific examples of the cellulosic substrates include, for example, microcrystalline cellulose (Avicel), filter paper, waste paper, pulp, wood, rice straw, wheat straw, rice husk, rice bran, wheat bran, sugarcane bagasse, coffee grounds, and tea lees. The cellulosic substrate may also be used after being subject to a pretreatment such as hydrothermal decomposition treatment, acid treatment, alkaline treatment, steaming, blasting, and grinding. Examples of preferred commercially-available cellulosic substrates include Solka-floc (International Fiber Corp, North Tonawanda, NY, U.S.A). As the carbon source, one kind of carbon source may be used, or two or more kinds of carbon sources may be used in combination.

Specific examples of the nitrogen source include, for example, ammonium salts such as ammonium sulfate, ammonium chloride, and ammonium phosphate, organic nitrogen sources such as peptone, yeast extract, meat extract, corn steep liquor, and soybean protein decomposition product, ammonia, and urea. As the nitrogen source, one kind of nitrogen source may be used, or two or more kinds of nitrogen sources may be used in combination.

Specific examples of the phosphate source include, for example, phosphate salts such as potassium dihydrogenphosphate and dipotassium hydrogenphosphate, and phosphoric acid polymers such as pyrophosphoric acid. As the phosphate source, one kind of phosphate source may be used, or two or more kinds of phosphate sources may be used in combination.

Specific examples of the sulfur source include, for example, inorganic sulfur compounds such as sulfates, thiosulfates, and sulfites, and sulfur-containing amino acids such as cysteine, cystine, and glutathione. As the sulfur source, one kind of sulfur source may be used, or two or more kinds of sulfur sources may be used in combination.

Specific examples of the other various organic and inorganic components include, for example, inorganic salts such as sodium chloride, and potassium chloride; trace metals such as iron, manganese, magnesium, and calcium; vitamins such as vitamin B1, vitamin B2, vitamin B6, nicotinic acid, nicotinamide, and vitamin B12; amino acids; nucleic acids; and organic components containing these such as peptone, casamino acid, yeast extract, and soybean protein decomposition product. As the other various organic and inorganic components, one kind of component may be used, or two or more kinds of components may be used in combination.

Culture conditions are not particularly limited, so long as the microorganism can proliferate, and the objective protein is produced. The culture can be performed with, for example, conditions typically used for the culture of microorganisms such as filamentous fungi. Regarding specific culture conditions, for example, culture conditions disclosed in prior reports concerning *Talaromyces cellulolyticus* (Japanese Patent Laid-open (Kokai) No. 2003-135052, Japanese Patent Laid-open (Kokai) No. 2008-271826, Japanese Patent Laid-open (Kokai) No. 2008-271927, etc.) or culture conditions used for culturing other various cellulase-producing microorganisms such as *Trichoderma reesei* can be used as a reference.

The culture can be performed, for example, under aerobic conditions using a liquid medium. The culture under aerobic conditions can be performed, specifically, as a culture with aeration, shaking. stirring, or a combination thereof. The culture temperature may be, for example, 15 to 43° C., and may particularly be approximately 30° C. The culture period may be, for example, 2 hours to 20 days. The culture can be performed as batch culture, fed-batch culture, continuous culture, or a combination of these. The culture medium used at the start of the culture can also be referred to as "starting medium". The culture medium supplied to the culture system (e.g. fermentation tank) in the fed-batch culture or the continuous culture can also be referred to as "feed medium". To supply a feed medium to the culture system in the fed-batch culture or the continuous culture can also be referred to as "feed". The culture may also be performed separately as a seed culture and a main culture. For example, the seed culture may be performed using a solid medium such as an agar medium, and the main culture may be performed using a liquid medium. The culture may be continued, for example, until the carbon source present in the culture medium is consumed, or until the activity of the microorganism is lost.

The culture medium components each may be present in the starting medium, the feed medium, or both. The types of the components present in the starting medium may be or may not be the same as those of the components present in the feed medium. Furthermore, the concentrations of the components present in the starting medium may be or may not be the same as the concentrations of the components present in the feed medium. Furthermore, two or more kinds of feed media having components of different types and/or different concentrations may be used. For example, when feeding is intermittently performed two or more times, the types and/or concentrations of components present in the feed medium may be or may not be the same for each feeding.

The concentrations of various components can be measured by gas chromatography (Hashimoto, K. et al. 1996. Biosci. Biotechnol. Biochem. 70:22-30) or HPLC (Lin, J. T. et al. 1998. J. Chromatogr. A. 808: 43-49).

By culturing the microorganism as mentioned above, the objective protein is expressed and a culture broth containing the objective protein is obtained. The objective protein may be accumulated in a culture medium, on a cell surface layer, in microbial cells, or in/on a combination thereof. The objective protein may be accumulated particularly in microbial cells.

Production of the objective protein can be confirmed by known methods used for detection or identification of proteins. Examples of such methods include, for example, SDS-PAGE, Western blotting, mass spectrometry, N-terminal amino acid sequence analysis, and enzyme activity measurement. One of these methods may be used alone, or two or more of these methods may be used in combination as required.

The objective protein generated can be collected as required. That is, the method for producing the objective protein may include a step of collecting the objective protein generated. Specifically, the objective protein can be collected as an appropriate fraction containing the objective protein. Examples of such a fraction include, for example, a culture broth, a culture supernatant, microbial cells, and a processed product of microbial cells (a disruption product, a lysate, and an extract (cell-free extract)). The microbial cells may also be provided, for example, in a form of immobilized cells immobilized on a carrier such as acrylamide and carrageenan.

Furthermore, the objective protein may be separated and purified to a desired extent. The objective protein may be provided in a form of a free enzyme, or may be provided in a form of an immobilized enzyme immobilized on a solid phase such as a resin.

When the objective protein accumulates in the culture medium, for example, solids such as microbial cells can be removed from the culture broth by centrifugation or the like, and then the objective protein can be separated and purified from the culture supernatant.

When the objective protein accumulates in microbial cells, for example, the microbial cells can be subject to a treatment such as disruption, lysis, or extraction, and then the objective protein can be separated and purified from the treated product. The microbial cells can be collected from the culture broth by centrifugation or the like. The treatment such as disruption, lysis, or extraction can be performed by known methods. Examples of such methods include, for example, disruption by ultrasonication, disruption in Dyno-Mill, disruption in bead mill, disruption with French press, and lysozyme treatment. One of these methods may be used alone, or two or more of these methods may be used in combination as required.

When the objective protein is accumulated on a cell surface layer, for example, the objective protein can be solubilized and then separated and purified from the solubilized product. Solubilization can be performed by known methods. Examples of such methods include, for example, an increase in a salt concentration and use of a surfactant. One of these methods may be used alone, or two or more of these methods may be used in combination as required.

Purification of the objective protein, such as purification of the objective protein from such a supernatant, treated product, or solubilized product as described above, can be performed by known methods used for purification of proteins. Examples of such methods include, for example, ammonium sulfate fractionation, ion exchange chromatography, hydrophobic chromatography, affinity chromatography, gel filtration chromatography, and isoelectric precipitation. One of these methods may be used alone, or two or more of these methods may be used in combination as required.

In the culture broth, enzyme(s) other than the objective protein, including cellulases, and hemicellulases such as xylanase, xylobiase (beta-xylosidase), and arabinofuranosidase, may also be produced and accumulated together with the objective protein. The objective protein may be collected as a mixture with such other enzyme(s), or may be collected separately from such other enzyme(s).

The objective protein collected may be made into a formulation as required. The dosage form of the formulation is not particularly limited, and can be appropriately chosen according to various conditions such as use purpose of the objective protein. Examples of the dosage form include, for example, solution, suspension, powder, tablet, pill, and capsule. For preparing such a formulation, for example, pharmaceutically acceptable additives such as excipients, binders, disintegrating agents, lubricants, stabilizers, corrigents, odor-masking agents, perfumes, diluents, and surfactants can be used.

EXAMPLES

Hereinafter, the present invention will be more specifically explained with reference to non-limiting examples.

(1) Construction of yscB Gene-Deletion Strain Derived from *Talaromyces Cellulolyticus* Strain F09

The *T. cellulolyticus* strain F09 ΔsC was constructed from the *Talaromyces cellulolyticus* strain F09 (Japanese Patent Laid-open (Kokai) No. 2016-131533) as a parent strain by disruption of the sC gene (SEQ ID NO: 59) according to the following procedure so that the sC gene can be used as a recombinant marker. The strain F09 is a strain having a mutation (single nucleotide substitution) in a pyrF gene obtained from the *T. cellulolyticus* strain 56-25 (NITE BP-01685) as a parent strain. The strain F09 shows uracil auxotrophy due to the mutation in the pyrF gene.

First, a DNA fragment for sC gene disruption having a nucleotide sequence having an upstream region of the sC gene of *T. cellulolyticus* and a downstream region of the sC gene of *T. cellulolyticus* ligated in this order was prepared according to the following procedure. PCR was performed by using the genomic DNA of the *T. cellulolyticus* strain Y-94 (FERM BP-5826, CBS 136886) as the template in combination with primers of SEQ ID NOS: 1 and 2, to amplify the upstream region of the sC gene, or in combination with primers of SEQ ID NOS: 3 and 4, to amplify the downstream region of the sC gene. The PCR products were each purified by using Wizard SV Gel and PCR Clean-Up System (Promega). In-Fusion HD Cloning Kit (Takara Bio) was used to incorporate the purified PCR products into a pUC plasmid included in the kit and to thereby ligate them. The *Escherichia coli* strain JM109 was transformed with the reaction product, and cultured on LB agar medium containing 100 mg/L ampicillin at 37° C. overnight, to form colonies. A plasmid pUC-ΔsC, into which the DNA fragment for sC disruption has been incorporated, was obtained from an obtained transformant by using Wizard Plus Miniprep System (Promega). PCR was performed by using the plasmid pUC-ΔsC as the template and primers of SEQ ID NOS: 1 and 4, to amplify the DNA fragment for sC disruption, and the fragment was concentrated and purified by ethanol precipitation.

Then, the strain F09 was inoculated into a culture medium containing 12 g/L Potato Dextrose Broth (Difco) and 20 g/L Bacto Agar (Difco), and cultured at 30° C. One agar disk excised from around the edge of a colony formed on the agar medium was inoculated into a culture medium containing 30 g/L Glucose, 20 g/L Yeast Extract (Becton, Dickinson and Company), 1 g/L Uracil, and 1 g/L Uridine, and shaking culture (120 rpm) was carried out at 30° C. for 2 days. Then, 2 mL of the resulting preculture broth was inoculated into a culture medium containing 24 g/L Potato Dextrose Broth, and gyratory culture (220 rpm) was carried out at 30° C. for 1 day. Cells were collected by centrifugation (5,000 rpm for 5 minutes), and 30 mL of a solution containing 10 g/L Yatalase (Takara Bio), 10 mM $KH_2PO_4$, and 0.8 M NaCl (pH 6.0) was added. Reaction was carried out at 30° C. for 2 hours with shaking, to digest cell walls and prepare protoplasts. After residues were removed by using a glass filter, protoplasts were collected by centrifugation (2,000 rpm for 10 minutes), and suspended with Tris-HCl buffer (pH 7.5) containing 1.2 M Sorbitol and 10 mM $CaCl_2$, to prepare 1 mL of a protoplast solution. A 200-μL aliquot of the protoplast solution was added with 10 μg of the purified DNA fragment for sC disruption, and 50 μL of Tris-HCl buffer (pH 7.5) containing 400 g/L PEG4000 and 10 mM $CaCl_2$, and left on ice for 30 minutes. Then, the mixture was further added with 1 mL of Tris-HCl buffer (pH 7.5) containing 400 g/L PEG4000 and 10 mM $CaCl_2$, and left at a room temperature for 15 minutes to allow transformation. Protoplasts were collected by centrifugation (2,000 rpm for 10 minutes), inoculated into a minimal medium (10 g/L Glucose, 10 mM $NH_4Cl$, 10 mM $KH_2PO_4$, 7 mM KCl, 2 mM $MgSO_4$, 0.06 mg/L $H_3BO_3$, 0.26 mg/L $(NH_4)_6Mo_7O_{24} \cdot 4H_2O$, 1 mg/L $FeCl_3 \cdot 6H_2O$, 0.4 mg/L $CuSO_4 \cdot 5H_2O$, 0.08 mg/L $MnCl_2$, 2 mg/L $ZnCl_2$, and 20 g/L Bacto Agar) containing 1 M sucrose, 1 mM sodium selenite, 30 mg/L methionine, 1 g/L uracil, and 1 g/L uridine, and cultured at 30° C. for 7 days, to select selenite-resistant strains. Since strains with a disrupted sC gene show selenite resistance and methionine auxotrophy, they can be selected on a selenite-containing medium containing methionine. A colony that appeared was inoculated into a minimal medium containing 1 mM sodium selenite, 30 mg/L methionine, 1 g/L Uracil, and 1 g/L Uridine and cultured at 30° C. for 4 days, and then removal of the sC gene was confirmed, to obtain the strain F09 ΔsC, which is a sC-disruption strain derived from F09.

Next, the *T. cellulolyticus* strain F09 ΔyscB was constructed from the *T. cellulolyticus* strain F09 ΔsC as a parent strain by disruption of the yscB gene (SEQ ID NO: 60) according to the following procedure.

First, a DNA fragment for yscB gene disruption having a nucleotide sequence consisting of an upstream region of the yscB gene of *T. cellulolyticus*, the sC gene marker of T *cellulolyticus* (SEQ ID NO: 61), and a downstream region of the yscB gene of *T. cellulolyticus* ligated in this order was prepared according to the following procedure. PCR was performed by using the genomic DNA of the *T. cellulolyticus* strain Y-94 (FERM BP-5826) as the template in combination with primers of SEQ ID NOS: 5 and 6, to amplify the upstream region of the yscB gene, in combination with primers of SEQ ID NOS: 7 and 8, to amplify the downstream region of the yscB gene, or in combination with primers of SEQ ID NOS: 9 and 10, to amplify the sC gene marker. The PCR products were each purified by using Wizard SV Gel and PCR Clean-Up System. In-Fusion HD Cloning Kit was used to incorporate the purified PCR products into a pUC plasmid included in the kit and to thereby ligate them. The *E. coli* strain JM109 was transformed with the reaction product, and cultured on LB agar medium containing 100 mg/L ampicillin at 37° C. overnight, to form colonies. A plasmid pUC-yscB::sC, into which the DNA fragment for yscB gene disruption has been incorporated, was obtained from an obtained transformant by using Wizard Plus Miniprep System. PCR was performed by using the plasmid pUC-yscB::sC as the template and primers of SEQ ID NOS: 5 and 8, to amplify the DNA fragment for yscB gene disruption, and the fragment was concentrated and purified by ethanol precipitation.

Then, the strain F09 ΔsC was inoculated into a culture medium containing 12 g/L Potato Dextrose Broth and 20 g/L Bacto Agar, and cultured at 30° C. One agar disk excised from around the edge of a colony formed on the agar medium was inoculated into a culture medium containing 30 g/L Glucose, 20 g/L Yeast Extract, 1 g/L Uracil, and 1 g/L Uridine, and shaking culture (120 rpm) was carried out at 30° C. for 2 days. Then, the 2 mL of resulting preculture broth was inoculated into a culture medium containing 24 g/L Potato Dextrose Broth, and gyratory culture (220 rpm) was carried out at 30° C. for 1 day. Cells were collected by centrifugation (5,000 rpm for 5 minutes), and 30 mL of a solution containing 10 g/L Yatalase, 10 mM $KH_2PO_4$, and 0.8 M NaCl (pH 6.0) was added. Reaction was carried out at 30° C. for 2 hours with shaking, to digest cell walls and prepare protoplasts. After residues were removed by using a glass filter, protoplasts were collected by centrifugation (2,000 rpm for 10 minutes), and suspended with Tris-HCl buffer (pH 7.5) containing 1.2 M Sorbitol and 10 mM $CaCl_2$, to prepare 1 mL of a protoplast solution. A 200-µL aliquot of the protoplast solution was added with 10 µg of the purified DNA fragment for yscB gene disruption, and 50 µL of Tris-HCl buffer (pH 7.5) containing 400 g/L PEG4000 and 10 mM $CaCl_2$, and left on ice for 30 minutes. Then, the mixture was further added with 1 mL of Tris-HCl buffer (pH 7.5) containing 400 g/L PEG4000 and 10 mM $CaCl_2$, and left at a room temperature for 15 minutes to allow transformation. Protoplasts were collected by centrifugation (2,000 rpm for 10 minutes), inoculated into a minimal medium (10 g/L Glucose, 10 mM $NH_4Cl$, 10 mM $KH_2PO_4$, 7 mM KCl, 2 mM $MgSO_4$, 0.06 mg/L $H_3BO_3$, 0.26 mg/L $(NH_4)_6Mo_7O_{24} \cdot 4H_2O$, 1 mg/L $FeCl_3 \cdot 6H_2O$, 0.4 mg/L $CuSO_4 \cdot 5H_2O$, 0.08 mg/L $MnCl_2$, 2 mg/L $ZnCl_2$, and 20 g/L Bacto Agar) containing 1 M sucrose, 1 g/L uracil, and 1 g/L uridine, and cultured at 30° C. for 7 days, to select strains whose methionine auxotrophy has been complemented. A colony that appeared was inoculated into a minimal medium containing 1 g/L Uracil and 1 g/L Uridine and cultured at 30° C. for 4 days, and then replacement of the yscB gene with the sC gene was confirmed, to obtain the strain F09 ΔyscB, which is a yscB gene-disruption strain derived from the strain F09.

(2) Construction of Pep4 Gene-Deletion Strain Derived from *T. cellulolyticus* Strain F09 and Culture of the Same A strain with disruption of the pep4 gene encoding Pep4 protease (GenBank accession Number: GAM39722.1) was constructed from the *T. cellulolyticus* strain F09 ΔyscB as a parent strain according to the following procedure.

First, a DNA fragment for pep4 gene disruption having a nucleotide sequence having an upstream region of the pep4 gene of *T. cellulolyticus*, the pyrF gene marker of T *cellulolyticus* (SEQ ID NO: 62), and a downstream region of the pep4 gene of *T. cellulolyticus* ligated in this order was prepared according to the following procedure. PCR was performed by using the genomic DNA of the *T. cellulolyticus* strain Y-94 (FERM BP-5826) as the template in combination with primers of SEQ ID NOS: 27 and 28, to amplify the upstream region of the pep4 gene, in combination with primers of SEQ ID NOS: 29 and 30, to amplify the downstream region of the pep4 gene, or in combination with primers of SEQ ID NOS: 31 and 32, to amplify the pyrF gene marker. The PCR products were each purified by using Wizard SV Gel and PCR Clean-Up System. In-Fusion HD Cloning Kit was used to incorporate the purified PCR products into a pUC plasmid included in the kit as a combination of the upstream region and downstream region of the pep4 gene and the pyrF gene marker. The *E. coli* strain JM109 was transformed with the reaction product, and cultured on LB agar medium containing 100 mg/L ampicillin at 37° C. overnight, to form colonies. A plasmid pUC-pep4::pyrF, into which the DNA fragment for pep4 gene disruption has been incorporated, was obtained from an obtained transformant by using Wizard Plus Miniprep System. PCR was performed by using the plasmid pUC-pep4::pyrF as the template and primers of SEQ ID NOS: 33 and 34, to amplify the DNA fragment for Pep4 protease gene disruption, and the fragment was concentrated and purified by ethanol precipitation.

Then, the strain F09 ΔyscB was cultured and converted to protoplasts in a similar manner to (1), and transformed with the purified DNA fragment for pep4 gene disruption in a similar manner to (1). Protoplasts were collected by centrifugation (2,000 rpm for 10 minutes), inoculated into a minimal medium containing 1 M sucrose, and cultured at 30° C. for 7 days, to select strains whose uracil auxotrophy has been complemented. A colony that appeared was inoculated into a minimal medium and cultured at 30° C. for 4 days, and then replacement of the pep4 gene region with the pyrF gene marker was confirmed, to obtain a pep4 gene-disruption strain derived from the strain F09 ΔyscB (hereinafter, also referred to as "Δpep4 strain").

In addition, in order to obtain a control having the same auxotrophy, a yscB gene-disruption strain was constructed from the strain F09 as a parent strain according to the following procedure.

First, a DNA fragment for yscB gene disruption having a nucleotide sequence having an upstream region of the yscB gene of *T. cellulolyticus*, the pyrF gene marker of T *cellulolyticus* (SEQ ID NO: 62), and a downstream region of the yscB gene of *T. cellulolyticus* ligated in this order was prepared according to the following procedure. PCR was performed by using the genomic DNA of the *T. cellulolyticus* strain Y-94 (FERM BP-5826) as the template in combination with primers of SEQ ID NOS: 5 and 35, to amplify the upstream region of the yscB gene, in combination with primers of SEQ ID NOS: 36 and 8, to amplify the downstream region of the yscB gene, or in combination with primers of SEQ ID NOS: 31 and 32, to amplify the pyrF gene marker. The PCR products were each purified by using Wizard SV Gel and PCR Clean-Up System. In-Fusion HD Cloning Kit was used to incorporate the purified PCR products into a pUC plasmid included in the kit. The *E. coli* strain JM109 was transformed with the reaction product, and cultured on LB agar medium containing 100 mg/L ampicillin at 37° C. overnight, to form colonies. A plasmid pUC-yscB::pyrF, into which the DNA fragment for yscB gene disruption has been incorporated, was obtained from an obtained transformant by using Wizard Plus Miniprep System. PCR was performed by using the plasmid pUC-yscB::pyrF as the template and primers of SEQ ID NOS: 5 and 8, to amplify the DNA fragment for yscB gene disruption, and the fragment was concentrated and purified by ethanol precipitation.

Then, the strain F09 was cultured and converted to protoplasts in a similar manner to (1), and transformed with the purified DNA fragment for yscB gene disruption in a similar manner to (1). Protoplasts were collected by centrifugation (2,000 rpm for 10 minutes), inoculated into a minimal medium containing 1 M sucrose, and cultured at 30° C. for 7 days, to select strains whose uracil auxotrophy has been complemented. A colony that appeared was inoculated into a minimal medium and cultured at 30° C. for 4 days, and then replacement of the yscB gene region with the pyrF gene marker was confirmed, to obtain a yscB gene-disruption strain derived from the strain F09 (hereinafter, also referred to as "control strain") as a control for evaluation of protease activity.

The control strain and the Δpep4 strain were each inoculated into a culture medium containing 12 g/L Potato Dextrose Broth and 20 g/L Bacto Agar, and cultured at 30° C. One agar disk excised from around the edge of a colony formed on the agar medium was crushed, transferred to a 14 mL-volume polypropylene round tube (Corning), and 2 mL of a liquid culture medium containing 5 g/L Potato Dextrose Broth was added, and then reciprocal shaking culture (120 rpm) was carried out at 30° C. for 2 days. The total volume of the culture broth was inoculated into 20 mL of a liquid culture medium containing 40 g/L Solka Floc® (International Fiber Corporation), 1 g/L Corn steep liquor (Sigma-Aldrich, Lot number: MKBN0183V), 24 g/L $KH_2PO_4$, 5 g/L $(NH_4)_2SO_4$, 4 g/L Urea, 1 g/L Tween80, 1.2 g/L $MgSO_4 \cdot 7H_2O$, 0.01 g/L $ZnSO_4 \cdot 7H_2O$, 0.01 g/L $MnSO_4 \cdot 5H_2O$, and 0.01 g/L $CuSO_4 \cdot 5H_2O$, and reciprocal gyratory culture (220 rpm) was carried out at 30° C. for 10 days using a 300 mL-volume conical flask. The obtained culture broth was centrifuged at 15,000 rpm for 5 minutes, and then filtered with a 0.22 μm filter, to thereby obtain a culture supernatant.

(3) Measurement of Protease Activity of Culture Supernatants of *T. Cellulolyticus* in the Presence and Absence of Pepstatin A The protein concentration of the culture supernatant of each strain was measured using Protein Assay CBB (Nacalai Tesque). To confirm protease activity against casein, protease activity was measured using Amplite™ Universal Fluorimetric Protease Activity Assay Kit *Green (AAT Bioquest, Inc.). At the same time, protease activity was also measured under conditions in which an aspartate protease inhibitor pepstatin A was added.

A 50-μL aliquot of a 2× assay buffer included in the kit containing 0.5 μL of a protease substrate included in the kit (green fluorescent casein substrate) was dispensed into a 96-well plate (Greiner, product number: 655090), and 50 μL of the culture supernatants of the control strain and the Δpep4 strain were added to respective wells. Under conditions with pepstatin A addition, pepstatin A (Sigma-Aldrich, product number: P2032) was added at a final concentration of 10 μM. Protease activity was measured by measuring Relative Fluorescence Units (RFU, excitation/emission=490/525 nm) every 2 minutes at 37° C. using a microplate reader system SpectraMax® M2 (Molecular Devices). The obtained RFU was divided by the total amount of protein used in the measurement and the reaction time, to thereby calculate the protease specific activity per total amount of protein in the culture supernatant. The results are shown in Table 1. In the table, the term "relative activity" represents the ratio of the protease specific activity of each sample to the protease specific activity of the control strain in the absence of pepstatin A. In the absence of pepstatin A, the protease specific activity of the culture supernatant of the Δpep4 strain was reduced to approximately 36% of that of the control strain. In addition, most (about 88%) of the protease specific activity of the culture supernatant of the control strain was inhibited by pepstatin A. On the other hand, almost no difference in the protease specific activity of the culture supernatant of the Δpep4 strain was observed between the presence or absence of pepstatin A. Thus, it was revealed that most of the extracellular protease activity of *T. cellulolyticus* is derived from aspartate protease and most of the aspartate protease-derived protease activity is derived from Pep4 protease. From these results, it was considered that most of the protease activity of the culture supernatant of *T. cellulolyticus* is derived from Pep4 protease, and Pep4 protease is an important protease that should be deleted when expressing heterologous proteins using *T. cellulolyticus* as a host.

TABLE 1

| Strain name | Final concentration of Pepstatin A (μM) | Protein concentration of culture supernatant (g/L) | Protease specific activity (RFU/ug/min) | Relative activity (%) |
|---|---|---|---|---|
| Control strain | 0 | 3.9 | 0.048 | 100 |
| Control strain | 10 | 3.9 | 0.006 | 12 |
| Δpep4 strain | 0 | 2.2 | 0.017 | 36 |
| Δpep4 strain | 10 | 2.2 | 0.016 | 34 |

(4) Evaluation of Human IgG (Trastuzumab) Degradation Activity by Culture Supernatant of *T. Cellulolyticus*

To confirm Trastuzumab degradation activity by proteases contained in the culture supernatants of the control strain and the Δpep4 strain, 0.5 g/L Herceptin® (Chugai Pharmaceutical, Trastuzumab (recombinant)) was dissolved in a solution (pH 4.3) that mimics a culture medium used for actual liquid culture, the solution containing 24 g/L KH$_2$PO$_4$, 5 g/L (NH$_4$)$_2$SO$_4$, 2 g/L Urea, 1 g/L Tween80, 1.2 g/L MgSO$_4$·7H$_2$O, 0.01 g/L ZnSO$_4$·7H$_2$O, 0.01 g/L MnSO$_4$·5H$_2$O, and 0.01 g/L CuSO$_4$·5H$_2$O. To 90 μL of this Herceptin solution, 10 μL of the culture supernatant of the control strain or the Δpep4 strain diluted with water to a total protein concentration of 0.2 g/L, or 10 μL of water was added. Separately, to 90 μL of the Herceptin solution, 10 μL of the culture supernatant of the control strain or the Δpep4 strain (having a total protein concentration of 0.2 g/L) whose protease activity was inactivated by treatment at 95° C. for 5 minutes was added. Each mixture was incubated at 37° C. for 3 days.

Next, Western blotting was performed using each mixture after incubation as a sample. To 3 μL of each sample diluted 20-fold with water, 2 μL of water and 5 μL of Laemmli buffer were added, heated at 70° C. for 10 min, then the total volume was loaded onto Any kD™ Mini-PROTEAN® TGX™ precast gel (Bio-rad), and electrophoresed at 200 V for 40 minutes together with a protein molecular weight marker A Precision Plus Protein Dual Color Standard (Bio-Rad). Proteins in the gel were transferred to a PVDF membrane (Invitrogen) using iBind Western Device (ThermoFisher), and probed with Anti-Human IgG F(ab')2, F(ab')2 fragment, highly cross absorbed-Peroxidase antibody produced in goat (Sigma-Aldrich, product number: SAB3701242) diluted at 1:20,000 with 5-fold diluted iBind™ FD Solution (Invitrogen). ECL (Enhanced Chemi Luminescence) reaction was performed by adding ECL Prime Western Blotting Detection Reagent (GE Healthcare) to the PVDF membrane, and luminescence was detected using Amersham Imager 600 (GE Healthcare).

The results are shown in FIG. 1. In the sample obtained by incubating water or any of the culture supernatants having inactivated protease activity with Herceptin®, only a band indicating the full length of Trastuzumab wad detected. In contrast, in the sample obtained by incubating the culture supernatant of the control strain with Herceptin®, a band indicating a degradation product of Trastuzumab was detected at the lower molecular weight side (approximately 150 kD), suggesting that a part of Trastuzumab was degraded. In the sample obtained by incubating the culture supernatant of the Δpep4 strain with Herceptin®, the band indicating a degradation product of Trastuzumab was scarcely detected. Thus, it was revealed that Pep4 protease contained in the culture supernatant of the control strain contributed to most of the enzyme-dependent degradation of Trastuzumab, and it was considered that Pep4 protease is an important protease that should be deleted when expressing heterologous proteins (e.g., IgG such as Trastuzumab) by secretory expression using *T. cellulolyticus* as a host.

(5) Evaluation of Pep4 Protease Gene Disruption in Trastuzumab Producing Strain of *T. Cellulolyticus*

A strain expressing Trastuzumab was constructed from the *T. cellulolyticus* strain F09 ΔyscB as a parent strain according to the following procedure.

First, a DNA fragment for expressing Trastuzumab having a nucleotide sequence having an upstream region of the creA gene of *T. cellulolyticus*, an upstream region of the cbh2 gene (promoter; SEQ ID NO: 63) of *T. cellulolyticus*, CBH1 secretion signal sequence (SEQ ID NO: 64) of *T. cellulolyticus*, a Trastuzumab-heavy chain gene (SEQ ID NO: 65), a downstream region of the cbhI gene (terminator; SEQ ID NO: 66) of *T. cellulolyticus*, a pyrF gene marker (SEQ ID NO: 62) of *T. cellulolyticus*, an upstream region of the cbh2 gene (promoter; SEQ ID NO: 63) of *T. cellulolyticus*, CBH1 secretion signal sequence (SEQ ID NO: 64) of *T. cellulolyticus*, a Trastuzumab-light chain gene (SEQ ID NO: 67), a downstream region of the cbh2 gene (terminator; SEQ ID NO: 68) of *T. cellulolyticus*, and a downstream region of the creA gene of *T. cellulolyticus* ligated in this order was prepared according to the following procedure. PCR was performed by using the genomic DNA of the *T. cellulolyticus* strain Y-94 (FERM BP-5826) as the template in combination with primers of SEQ ID NOS: 37 and 38, to amplify the upstream region of the creA gene, in combination with primers of SEQ ID NOS: 39 and 40, to amplify the upstream region of the cbh2 gene, in combination with primers of SEQ ID NOS: 41 and 42, to amplify the CBH1 secretion signal sequence, in combination with primers of SEQ ID NOS: 43 and 44, to amplify the downstream region of the cbhI gene, in combination with primers of SEQ ID NOS: 31 and 32, to amplify the downstream region of the pyrF gene marker, in combination with primers of SEQ ID NOS: 45 and 40, to amplify the upstream region of the cbh2 gene, in combination with primers of SEQ ID NOS: 41 and 46, to amplify the CBH1 secretion signal sequence, in combination with primers of SEQ ID NOS: 47 and 48, to amplify the downstream region of the cbh2 gene, or in combination with primers of SEQ ID NOS: 49 and 50, to amplify the downstream region of the creA gene. Separately, PCR was performed by using a totally synthesized gene purchased from Eurofins as the template in combination with primers of SEQ ID NOS: 51 and 52, to amplify the Trastuzumab-heavy chain gene, or in combination with primers of SEQ ID NOS: 53 and 54, to amplify the Trastuzumab-light chain gene. The PCR products were purified by using Wizard SV Gel and PCR Clean-Up System. The purified PCR products were mutually ligated by repeating PCR using a mixture of each combination of two of the purified PCR products as the template, and incorporated by using In-Fusion HD Cloning Kit into a pUC plasmid included in the kit. The *E. coli* strain JM109 was transformed with the reaction product, and cultured on LB agar medium containing 100 mg/L ampicillin at 37° C. overnight, to form colonies. A plasmid pUC-creA::Pcbh2-Her_H-pyrF-Pcbh2-Her_L, into which the DNA fragment for expressing Trastuzumab has been incorporated, was obtained from an obtained transformant by using Wizard Plus Miniprep System. PCR was performed by using the plasmid pUC-creA::Pcbh2-Her_H-pyrF-Pcbh2-Her_L as the template and primers of SEQ ID NOS: 37 and 50, to amplify the DNA fragment for expressing Trastuzumab, and the fragment was concentrated and purified by ethanol precipitation. Incidentally, ligation of the upstream and downstream regions of the creA gene at the respective ends of the Trastuzumab expressing sequence enables insertion of the Trastuzumab expressing sequence not into a random site of the genome but into the creA gene region as the target.

Then, the strain F09 ΔyscB was cultured and converted to protoplasts in a similar manner to Example (1), and transformed with the purified DNA fragment for expressing Trastuzumab in a similar manner to Example (1). The protoplasts were collected by centrifugation (2,000 rpm for 10 minutes), inoculated into a minimal medium containing 1 M sucrose, and cultured at 30° C. for 7 days, to select strains whose uracil auxotrophy has been complemented. A colony that appeared was inoculated into a minimal medium and cultured at 30° C. for 4 days, and then replacement of the creA gene region with the Trastuzumab expressing sequence was confirmed, to obtain a Trastuzumab expressing strain derived from the strain F09 ΔyscB.

Next, a pep4 gene-disruption strain was constructed from the Trastuzumab-expressing strain derived from the strain F09 ΔyscB according to the following procedure.

First, a DNA fragment for pep4 gene disruption having a nucleotide sequence consisting of an upstream region of the pep4 gene of *T. cellulolyticus*, a hygromycin-resistance gene marker (SEQ ID NO: 69), and a downstream region of the pep4 gene of *T. cellulolyticus* ligated in this order was prepared according to the following procedure. PCR was performed by using the genomic DNA of the *T. cellulolyticus* strain Y-94 (FERM BP-5826) as the template in combination with primers of SEQ ID NOS: 27 and 55, to amplify the upstream region of the pep4 gene, or in combination with primers of SEQ ID NOS: 56 and 30, to amplify the downstream region of the pep4 gene. Separately, PCR was performed by using pcDNA3.1/Hygro(+) (LifeTechnologies) containing the hygromycin-resistance gene as the template and primers of SEQ ID NOS: 57 and 58, to amplify the hygromycin-resistance gene (including promoter and terminator). The PCR products were each purified by using Wizard SV Gel and PCR Clean-Up System. In-Fusion HD Cloning Kit was used to incorporate the purified PCR products into a pUC plasmid included in the kit and to thereby ligate them. The *E. coli* strain JM109 was transformed with the reaction product, and cultured on LB agar medium containing 100 mg/L ampicillin at 37° C. overnight, to form colonies. A plasmid pUC-pep4::hyg, into which the DNA fragment for pep4 gene disruption has been incorporated, was obtained from an obtained transformant by using Wizard Plus Miniprep System. PCR was performed by using the plasmid pUC-pep4::hyg as the template and primers of SEQ ID NOS: 27 and 30, to amplify the DNA fragment for pep4 gene disruption, and the fragment was concentrated and purified by ethanol precipitation.

Then, the Trastuzumab-expressing strain derived from the strain F09 ΔyscB was cultured and converted to protoplasts in a similar manner to (1), and transformed with the purified DNA fragment for pep4 gene disruption in a similar manner to (1). Protoplasts were collected by centrifugation (2,000 rpm for 10 minutes), inoculated into a minimal medium containing 1 M sucrose, cultured at 30° C. for 1 day, then overlaid with a medium containing 0.5 g/L Hygromycin B, 24 g/L Potato Dextrose Broth, and 7 g/L Bacto Agar, and further cultured at 30° C. for 3 days, to select hygromycin-resistant strains. A colony that appeared was inoculated into a minimal medium containing 0.5 g/L Hygromycin B and cultured at 30° C. for 4 days, and then replacement of the pep4 gene with the hygromycin-resistance gene was confirmed, to obtain a pep4 gene-disruption strain of the Trastuzumab-expressing strain derived from the strain F09 ΔyscB.

The Trastuzumab-expressing strain derived from the strain F09 ΔyscB and the pep4 gene-disruption strain thereof were each inoculated into a culture medium containing 12 g/L Potato Dextrose Broth (Difco) and 20 g/L Bacto Agar (Difco), and cultured at 30° C. One agar disk excised from around the edge of a colony formed on the agar medium was inoculated into a culture medium containing 30 g/L Glucose, 20 g/L Yeast Extract, 1 g/L Uracil, and 1 g/L Uridine, and shaking culture (120 rpm) was carried out at 30° C. for 2 days. Then, 2 mL of the resulting preculture broth was inoculated into 20 mL of a liquid culture medium containing 40 g/L Solka Floc, 10 g/L Pharmamedia (Archer Daniels Midland Company), 24 g/L $KH_2PO_4$, 5 g/L $(NH_4)_2SO_4$, 4 g/L Urea, 4.7 g/L Potassium sodium (+)-tartrate tetrahydrate, 1 g/L Tween80, 1.2 g/L $MgSO_4 \cdot 7H_2O$, 0.01 g/L $ZnSO_4 \cdot 7H_2O$, 0.01 g/L $MnSO_4 \cdot 5H_2O$, and 0.01 g/L $CuSO_4 \cdot 5H_2O$, and cultured at 220 rpm at 30° C. for 7 days. The obtained culture broth was filtered with a 0.22 μm filter, to thereby obtain a culture supernatant.

To confirm the secretory production amounts of Trastuzumab and a Trastuzumab degradation product by the Trastuzumab-expressing strain derived from the strain F09 ΔyscB and the pep4 gene-disruption strain thereof, Western blotting was performed in a similar manner to (4).

Figure 2:
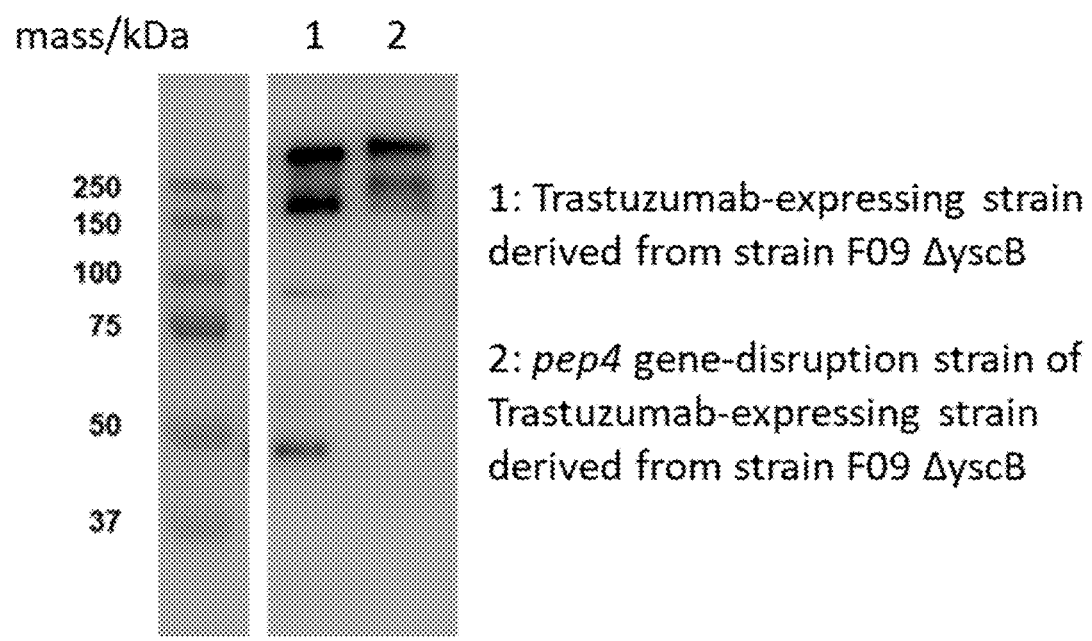
FIG. 2 shows a diagram (photograph) showing a result of production of Trastuzumab by a Trastuzumab-expressing strain derived from *T. cellulolyticus* strain F09 ΔyscB and a pep4 gene-disruption strain thereof.

The results are shown in FIG. 2. The ratio of the amount of the Trastuzumab degradation product to the amount of the full-length Trastuzumab was decreased in the pep4 gene-disruption strain of the Trastuzumab-expressing strain derived from the strain F09 ΔyscB as compared to the Trastuzumab-expressing strain derived from the strain F09 ΔyscB. Thus, it was suggested that Trastuzumab degradation was suppressed by disrupting the pep4 gene. From these results, it was revealed that Pep4 protease is an important protease that should be deleted when expressing heterologous proteins (e.g., IgG such as Trastuzumab) by secretory expression using *T. cellulolyticus* as a host.

INDUSTRIAL APPLICABILITY

According to the present invention, a protein can be efficiently produced.

Explanation of Sequence Listing

SEQ ID NOS:

1-58: Primers

59: Nucleotide sequence of sC gene of *Talaromyces cellulolyticus* strain 56-25

60: Nucleotide sequence of yscB gene of *Talaromyces cellulolyticus* strain S6-25

61: Nucleotide sequence of sC gene marker

62: Nucleotide sequence of pyrF gene marker

63: Nucleotide sequence of cbh2 promoter of *Talaromyces cellulolyticus*

64: Nucleotide sequence encoding CbhI signal peptide of *Talaromyces cellulolyticus*

65: Nucleotide sequence of Trastuzumab-heavy chain gene

66: Nucleotide sequence of cbhI terminator

67: Nucleotide sequence of Trastuzumab-light chain gene

68: Nucleotide sequence of cbh2 terminator

69: Nucleotide sequence of hygromycin-resistance gene marker

70: Nucleotide sequence of pep4 gene of *Talaromyces cellulolyticus* strain Y-94

71: Amino acid sequence of Pep4 protein of *Talaromyces cellulolyticus* strain Y-94

72: Amino acid sequence of CbhI signal peptide of *Talaromyces cellulolyticus*

73: Amino acid sequence of YscB protein of *Talaromyces cellulolyticus* strain S6-25

74: Nucleotide sequence of creA gene of *Talaromyces cellulolyticus* strain S6-25

The invention claimed is:

1. A method for producing an objective protein, comprising
culturing a *Talaromyces cellulolyticus* strain having an objective protein-producing ability in a culture medium,
wherein the *Talaromyces cellulolyticus* strain has been modified so that the activity of a Pep4 protein is reduced as compared with a non-modified strain,
wherein the Pep4 protein is selected from the group consisting of:
(a) a protein comprising the amino acid sequence of SEQ ID NO: 71;
(b) a protein comprising the amino acid sequence of SEQ ID NO: 71, but which includes substitution, deletion, insertion, and/or addition of 1 to 10 amino acid residues, and wherein said protein has a protease activity;
(c) a protein comprising an amino acid sequence having an identity of 90% or higher to the amino acid sequence of SEQ ID NO: 71, and wherein said protein has a protease activity.

2. The method according to claim 1, wherein the activity of the Pep4 protein is reduced by reducing the expression of a pep4 gene or disrupting a pep4 gene.

3. The method according to claim 1, wherein the activity of the Pep4 protein is reduced by deletion of a pep4 gene.

4. The method according to claim 1, wherein the *Talaromyces cellulolyticus* strain has been further modified so that the activity of a YscB protein and/or a CreA protein is reduced as compared with a non-modified strain.

5. The method according to claim 4, wherein the activity of the YscB protein and/or the CreA protein is reduced by reducing the expression of a yscB gene and/or a creA gene, or disrupting a yscB gene and/or a creA gene.

6. The method according to claim 4, wherein the activity of the YscB protein and/or the CreA protein is reduced by deletion of a yscB gene and/or a creA gene.

7. The method according to claim 1, wherein the *Talaromyces cellulolyticus* strain is derived from *Talaromyces cellulolyticus* strain S6-25 (NITE BP-01685).

8. The method according to claim 1, further comprising collecting the objective protein.

9. The method according to claim 1, wherein the objective protein accumulates in the culture medium as a result of the culturing.

10. The method according to claim 1, wherein the objective protein is expressed as a fused protein and said fused protein comprises a signal peptide that functions in the *Talaromyces cellulolyticus* strain.

11. The method according to claim 1, wherein the objective protein is a heterologous protein.

12. The method according to claim 1, wherein the objective protein is a protein derived from human.

13. The method according to claim 1, wherein the objective protein is an antibody-related molecule.

14. The method according to claim 2 or 3, wherein the pep4 gene is a gene selected from the group consisting of:
(a) a gene comprising the nucleotide sequence of SEQ ID NO: 70;
(b) a gene encoding a protein comprising the amino acid sequence of SEQ ID NO: 71;
(c) a gene encoding a protein comprising the amino acid sequence of SEQ ID NO: 71, but which includes substitution, deletion, insertion, and/or addition of 1 to 10 amino acid residues, and wherein said protein has a protease activity;
(d) a gene encoding a protein comprising an amino acid sequence having an identity of 90% or higher to the amino acid sequence of SEQ ID NO: 71, and wherein said protein has a protease activity.

15. The method according to claim 4, wherein the YscB protein is selected from the group consisting of:
(a) a protein comprising the amino acid sequence of SEQ ID NO: 73;
(b) a protein comprising the amino acid sequence of SEQ ID NO: 73, but which includes substitution, deletion, insertion, and/or addition of 1 to 10 amino acid residues, and wherein said protein has a protease activity;
(c) a protein comprising an amino acid sequence having an identity of 90% or higher to the amino acid sequence of SEQ ID NO: 73, and wherein said protein has a protease activity, and
wherein the CreA protein is selected from the group consisting of:
(d) a protein comprising the amino acid sequence encoded by the nucleotide sequence of SEQ ID NO: 74;
(e) a protein comprising the amino acid sequence encoded by the nucleotide sequence of SEQ ID NO: 74, but which includes substitution, deletion, insertion, and/or addition of 1 to 10 amino acid residues, and wherein said protein has a protease activity;
(f) a protein comprising an amino acid sequence having an identity of 90% or higher to the amino acid sequence encoded by the nucleotide sequence of SEQ ID NO: 74, and wherein said protein has a protease activity.

16. The method according to claim 5 or 6, wherein the yscB gene is a gene selected from the group consisting of:
(a) a gene comprising the nucleotide sequence of SEQ ID NO: 60;
(b) a gene encoding a protein comprising the amino acid sequence of SEQ ID NO: 73;
(c) a gene encoding a protein comprising the amino acid sequence of SEQ ID NO: 73, but which includes substitution, deletion, insertion, and/or addition of 1 to 10 amino acid residues, and wherein said protein has a protease activity;
(d) a gene encoding a protein comprising an amino acid sequence having an identity of 90% or higher to the amino acid sequence of SEQ ID NO: 73, and therein said protein has a protease activity, and/or
wherein the creA gene is a gene selected from the group consisting of:
(e) a gene comprising the nucleotide sequence of SEQ ID NO: 74;
(f) a gene encoding a protein comprising the amino acid sequence encoded by the nucleotide sequence of SEQ ID NO: 74
(g) a gene encoding a protein comprising the amino acid sequence encoded by the nucleotide sequence of SEQ ID NO: 74, but which includes substitution, deletion, insertion, and/or addition of 1 to 10 amino acid residues, and wherein said protein has a protease activity;
(h) a gene encoding a protein comprising the amino acid sequence having an identity of 90% or higher to the amino acid sequence encoded by the nucleotide sequence of SEQ ID NO: 74, and wherein said protein has a protease activity.

17. The method according to claim 1, wherein the *Talaromyces cellulolyticus* strain comprises a genetic construct for expression of the objective protein.

18. The method according to claim 1, wherein the objective protein is a fusion protein with a signal peptide for secretory production of the objective protein.

19. The method according to claim 18, wherein the signal peptide is selected from the group consisting of:
- (a) a peptide comprising the amino acid sequence of SEQ ID NO: 72;
- (b) a peptide comprising the amino acid sequence of SEQ ID NO: 72, but which includes substitution, deletion, insertion, and/or addition of 1 to 3 amino acid residues, and wherein said peptide has a function of providing secretion of the objective protein;
- (c) a peptide comprising the amino acid sequence having an identity of 90% or higher to the amino acid sequence of SEQ ID NO: 72, and wherein said peptide has a function of providing secretion of the objective protein.

* * * * *

SEQUENCE LISTING

```
Sequence total quantity: 74
SEQ ID NO: 1               moltype = DNA   length = 40
FEATURE                    Location/Qualifiers
misc_feature               1..40
                           note = primer
source                     1..40
                           mol_type = other DNA
                           organism = synthetic construct
SEQUENCE: 1
cggtacccgg ggatcccctt cttgccagca cactgctccg                              40

SEQ ID NO: 2               moltype = DNA   length = 40
FEATURE                    Location/Qualifiers
misc_feature               1..40
                           note = primer
source                     1..40
                           mol_type = other DNA
                           organism = synthetic construct
SEQUENCE: 2
agctgcgagg tcaacggcta agcgccagtt tggtgaatcc                              40

SEQ ID NO: 3               moltype = DNA   length = 40
FEATURE                    Location/Qualifiers
misc_feature               1..40
                           note = primer
source                     1..40
                           mol_type = other DNA
                           organism = synthetic construct
SEQUENCE: 3
aactggcgct tagccgttga cctcgcagct ggcacgggat                              40

SEQ ID NO: 4               moltype = DNA   length = 40
FEATURE                    Location/Qualifiers
misc_feature               1..40
                           note = primer
source                     1..40
                           mol_type = other DNA
                           organism = synthetic construct
SEQUENCE: 4
cgactctaga ggatccgcca agggatccgt gagatcgcat                              40

SEQ ID NO: 5               moltype = DNA   length = 40
FEATURE                    Location/Qualifiers
misc_feature               1..40
                           note = primer
source                     1..40
                           mol_type = other DNA
                           organism = synthetic construct
SEQUENCE: 5
cggtacccgg ggatcttggg gcacagagac aacagggtca                              40

SEQ ID NO: 6               moltype = DNA   length = 40
FEATURE                    Location/Qualifiers
misc_feature               1..40
                           note = primer
source                     1..40
                           mol_type = other DNA
                           organism = synthetic construct
SEQUENCE: 6
acctgactcg accggagata gcgtgagcac actgagcagg                              40

SEQ ID NO: 7               moltype = DNA   length = 40
FEATURE                    Location/Qualifiers
misc_feature               1..40
                           note = primer
source                     1..40
                           mol_type = other DNA
                           organism = synthetic construct
SEQUENCE: 7
gcttgttgac ctcgccaaca cgctacctct tccacagtag                              40

SEQ ID NO: 8               moltype = DNA   length = 40
FEATURE                    Location/Qualifiers
misc_feature               1..40
                           note = primer
source                     1..40
                           mol_type = other DNA
                           organism = synthetic construct
```

```
SEQUENCE: 8
cgactctaga ggatcgagct gattgagcat gctaacgcag                              40

SEQ ID NO: 9            moltype = DNA   length = 25
FEATURE                 Location/Qualifiers
misc_feature            1..25
                        note = primer
source                  1..25
                        mol_type = other DNA
                        organism = synthetic construct
SEQUENCE: 9
ccggtcgagt caggtattca tatca                                              25

SEQ ID NO: 10           moltype = DNA   length = 25
FEATURE                 Location/Qualifiers
misc_feature            1..25
                        note = primer
source                  1..25
                        mol_type = other DNA
                        organism = synthetic construct
SEQUENCE: 10
gcgaggtcaa caagcctcaa accct                                              25

SEQ ID NO: 11           moltype = DNA   length = 40
FEATURE                 Location/Qualifiers
misc_feature            1..40
                        note = primer
source                  1..40
                        mol_type = other DNA
                        organism = synthetic construct
SEQUENCE: 11
cggtacccgg ggatcagcaa ccccaccgta atctcaaggt                              40

SEQ ID NO: 12           moltype = DNA   length = 40
FEATURE                 Location/Qualifiers
misc_feature            1..40
                        note = primer
source                  1..40
                        mol_type = other DNA
                        organism = synthetic construct
SEQUENCE: 12
ccgatctgaa ttgacattcg gatggacttt ttgaaggcca                              40

SEQ ID NO: 13           moltype = DNA   length = 40
FEATURE                 Location/Qualifiers
misc_feature            1..40
                        note = primer
source                  1..40
                        mol_type = other DNA
                        organism = synthetic construct
SEQUENCE: 13
tcggcgttca cttatgaggt tgacttgata gtcgatcgct                              40

SEQ ID NO: 14           moltype = DNA   length = 40
FEATURE                 Location/Qualifiers
misc_feature            1..40
                        note = primer
source                  1..40
                        mol_type = other DNA
                        organism = synthetic construct
SEQUENCE: 14
cgactctaga ggatcgttat tgctgttgct gttgtggttg                              40

SEQ ID NO: 15           moltype = DNA   length = 40
FEATURE                 Location/Qualifiers
misc_feature            1..40
                        note = primer
source                  1..40
                        mol_type = other DNA
                        organism = synthetic construct
SEQUENCE: 15
cggtacccgg ggatccatag cctcatgacc aatgaccggt                              40

SEQ ID NO: 16           moltype = DNA   length = 40
FEATURE                 Location/Qualifiers
misc_feature            1..40
                        note = primer
source                  1..40
                        mol_type = other DNA
```

```
                              organism = synthetic construct
SEQUENCE: 16
ccgatctgaa ttgacgtcga tgaagtcgtc gggggtatgt                              40

SEQ ID NO: 17             moltype = DNA   length = 40
FEATURE                   Location/Qualifiers
misc_feature              1..40
                          note = primer
source                    1..40
                          mol_type = other DNA
                          organism = synthetic construct
SEQUENCE: 17
tcggcgttca cttatcggct caatatgcaa taggtgttcc                              40

SEQ ID NO: 18             moltype = DNA   length = 40
FEATURE                   Location/Qualifiers
misc_feature              1..40
                          note = primer
source                    1..40
                          mol_type = other DNA
                          organism = synthetic construct
SEQUENCE: 18
cgactctaga ggatctaggg ctaaccagca gggtaccgcc                              40

SEQ ID NO: 19             moltype = DNA   length = 40
FEATURE                   Location/Qualifiers
misc_feature              1..40
                          note = primer
source                    1..40
                          mol_type = other DNA
                          organism = synthetic construct
SEQUENCE: 19
cggtacccgg ggatctagac gttagaactc tccccactgt                              40

SEQ ID NO: 20             moltype = DNA   length = 40
FEATURE                   Location/Qualifiers
misc_feature              1..40
                          note = primer
source                    1..40
                          mol_type = other DNA
                          organism = synthetic construct
SEQUENCE: 20
ccgatctgaa ttgaccttgc cgcttgaagt tgtatgaaat                              40

SEQ ID NO: 21             moltype = DNA   length = 40
FEATURE                   Location/Qualifiers
misc_feature              1..40
                          note = primer
source                    1..40
                          mol_type = other DNA
                          organism = synthetic construct
SEQUENCE: 21
tcggcgttca cttatgtgtt gcattcaaag atggctgcct                              40

SEQ ID NO: 22             moltype = DNA   length = 40
FEATURE                   Location/Qualifiers
misc_feature              1..40
                          note = primer
source                    1..40
                          mol_type = other DNA
                          organism = synthetic construct
SEQUENCE: 22
cgactctaga ggatccggcg tttgagctcc tggagtaaga                              40

SEQ ID NO: 23             moltype = DNA   length = 40
FEATURE                   Location/Qualifiers
misc_feature              1..40
                          note = primer
source                    1..40
                          mol_type = other DNA
                          organism = synthetic construct
SEQUENCE: 23
cggtacccgg ggatcaattc cgacagtgtc gtgctccagc                              40

SEQ ID NO: 24             moltype = DNA   length = 40
FEATURE                   Location/Qualifiers
misc_feature              1..40
                          note = primer
source                    1..40
```

```
                            mol_type = other DNA
                            organism = synthetic construct
SEQUENCE: 24
ccgatctgaa ttgacggcgg gcgattgata atgatgttgt                              40

SEQ ID NO: 25               moltype = DNA   length = 40
FEATURE                     Location/Qualifiers
misc_feature                1..40
                            note = primer
source                      1..40
                            mol_type = other DNA
                            organism = synthetic construct
SEQUENCE: 25
tcggcgttca cttatctagc gacgaggtca cgattatgag                              40

SEQ ID NO: 26               moltype = DNA   length = 40
FEATURE                     Location/Qualifiers
misc_feature                1..40
                            note = primer
source                      1..40
                            mol_type = other DNA
                            organism = synthetic construct
SEQUENCE: 26
cgactctaga ggatcacaag accttcaatc tctccaggag                              40

SEQ ID NO: 27               moltype = DNA   length = 40
FEATURE                     Location/Qualifiers
misc_feature                1..40
                            note = primer
source                      1..40
                            mol_type = other DNA
                            organism = synthetic construct
SEQUENCE: 27
cggtacccgg ggatctacac gcaagggaag aagtaagagc                              40

SEQ ID NO: 28               moltype = DNA   length = 40
FEATURE                     Location/Qualifiers
misc_feature                1..40
                            note = primer
source                      1..40
                            mol_type = other DNA
                            organism = synthetic construct
SEQUENCE: 28
ccgatctgaa ttgacgatgg ccaaccaacg ctaatgtatc                              40

SEQ ID NO: 29               moltype = DNA   length = 40
FEATURE                     Location/Qualifiers
misc_feature                1..40
                            note = primer
source                      1..40
                            mol_type = other DNA
                            organism = synthetic construct
SEQUENCE: 29
tcggcgttca cttatatcgg ttgacgggtt gctgaaatgc                              40

SEQ ID NO: 30               moltype = DNA   length = 39
FEATURE                     Location/Qualifiers
misc_feature                1..39
                            note = primer
source                      1..39
                            mol_type = other DNA
                            organism = synthetic construct
SEQUENCE: 30
cgactctaga ggatctagtc gcaggacgga atcgaacag                               39

SEQ ID NO: 31               moltype = DNA   length = 25
FEATURE                     Location/Qualifiers
misc_feature                1..25
                            note = primer
source                      1..25
                            mol_type = other DNA
                            organism = synthetic construct
SEQUENCE: 31
gtcaattcag atcggctgcc gcctg                                              25

SEQ ID NO: 32               moltype = DNA   length = 25
FEATURE                     Location/Qualifiers
misc_feature                1..25
                            note = primer
```

```
                          source              1..25
                                              mol_type = other DNA
                                              organism = synthetic construct
SEQUENCE: 32
ataagtgaac gccgagtcag tacta                                                 25

SEQ ID NO: 33              moltype = DNA   length = 26
FEATURE                    Location/Qualifiers
misc_feature               1..26
                           note = primer
source                     1..26
                           mol_type = other DNA
                           organism = synthetic construct
SEQUENCE: 33
cccagtcacg acgttgtaaa acgacg                                                26

SEQ ID NO: 34              moltype = DNA   length = 26
FEATURE                    Location/Qualifiers
misc_feature               1..26
                           note = primer
source                     1..26
                           mol_type = other DNA
                           organism = synthetic construct
SEQUENCE: 34
caggaaacag ctatgaccat gattac                                                26

SEQ ID NO: 35              moltype = DNA   length = 40
FEATURE                    Location/Qualifiers
misc_feature               1..40
                           note = primer
source                     1..40
                           mol_type = other DNA
                           organism = synthetic construct
SEQUENCE: 35
ccgatctgaa ttgacagata gcgtgagcac actgagcagg                                 40

SEQ ID NO: 36              moltype = DNA   length = 40
FEATURE                    Location/Qualifiers
misc_feature               1..40
                           note = primer
source                     1..40
                           mol_type = other DNA
                           organism = synthetic construct
SEQUENCE: 36
tcggcgttca cttatcaaca cgctacctct tccacagtag                                 40

SEQ ID NO: 37              moltype = DNA   length = 40
FEATURE                    Location/Qualifiers
misc_feature               1..40
                           note = primer
source                     1..40
                           mol_type = other DNA
                           organism = synthetic construct
SEQUENCE: 37
cggtacccgg ggatcagcgc agaccaatgc cagaggagaa                                 40

SEQ ID NO: 38              moltype = DNA   length = 25
FEATURE                    Location/Qualifiers
misc_feature               1..25
                           note = primer
source                     1..25
                           mol_type = other DNA
                           organism = synthetic construct
SEQUENCE: 38
gcgcgagttg cgcgatgaaa tttat                                                 25

SEQ ID NO: 39              moltype = DNA   length = 40
FEATURE                    Location/Qualifiers
misc_feature               1..40
                           note = primer
source                     1..40
                           mol_type = other DNA
                           organism = synthetic construct
SEQUENCE: 39
tcgcgcaact cgcgctgcta tgcagttgat gctactgtgt                                 40

SEQ ID NO: 40              moltype = DNA   length = 30
FEATURE                    Location/Qualifiers
misc_feature               1..30
```

```
                        note         = primer
source                  1..30
                        mol_type     = other DNA
                        organism     = synthetic construct
SEQUENCE: 40
agttgctaaa tgatcaagaa gcttcacttt                                        30

SEQ ID NO: 41           moltype = DNA   length = 40
FEATURE                 Location/Qualifiers
misc_feature            1..40
                        note         = primer
source                  1..40
                        mol_type     = other DNA
                        organism     = synthetic construct
SEQUENCE: 41
gttgaagctc agcaaattgg tacttatacc gctgaaaccc                             40

SEQ ID NO: 42           moltype = DNA   length = 40
FEATURE                 Location/Qualifiers
misc_feature            1..40
                        note         = primer
source                  1..40
                        mol_type     = other DNA
                        organism     = synthetic construct
SEQUENCE: 42
gacgagctgg acttcctgag caccagctgt tgccagcaag                             40

SEQ ID NO: 43           moltype = DNA   length = 30
FEATURE                 Location/Qualifiers
misc_feature            1..30
                        note         = primer
source                  1..30
                        mol_type     = other DNA
                        organism     = synthetic construct
SEQUENCE: 43
taaattttca cttctttctt cgcctattga                                        30

SEQ ID NO: 44           moltype = DNA   length = 45
FEATURE                 Location/Qualifiers
misc_feature            1..45
                        note         = primer
source                  1..45
                        mol_type     = other DNA
                        organism     = synthetic construct
SEQUENCE: 44
ccgatctgaa ttgacccgaa aacggtaagg cgtagttata gaaat                       45

SEQ ID NO: 45           moltype = DNA   length = 40
FEATURE                 Location/Qualifiers
misc_feature            1..40
                        note         = primer
source                  1..40
                        mol_type     = other DNA
                        organism     = synthetic construct
SEQUENCE: 45
tcggcgttca cttattgcta tgcagttgat gctactgtgt                             40

SEQ ID NO: 46           moltype = DNA   length = 40
FEATURE                 Location/Qualifiers
misc_feature            1..40
                        note         = primer
source                  1..40
                        mol_type     = other DNA
                        organism     = synthetic construct
SEQUENCE: 46
tgtcatctgg atgtcctgag caccagctgt tgccagcaag                             40

SEQ ID NO: 47           moltype = DNA   length = 25
FEATURE                 Location/Qualifiers
misc_feature            1..25
                        note         = primer
source                  1..25
                        mol_type     = other DNA
                        organism     = synthetic construct
SEQUENCE: 47
tagatcagct ttgagtgcag caaaa                                             25

SEQ ID NO: 48           moltype = DNA   length = 27
FEATURE                 Location/Qualifiers
```

```
misc_feature              1..27
                          note = primer
source                    1..27
                          mol_type = other DNA
                          organism = synthetic construct
SEQUENCE: 48
gcttgtttga gaatacatga ggttgcc                                        27

SEQ ID NO: 49             moltype = DNA   length = 40
FEATURE                   Location/Qualifiers
misc_feature              1..40
                          note = primer
source                    1..40
                          mol_type = other DNA
                          organism = synthetic construct
SEQUENCE: 49
tattctcaaa caagccctct ttctcgccct ttcttctcaa                          40

SEQ ID NO: 50             moltype = DNA   length = 40
FEATURE                   Location/Qualifiers
misc_feature              1..40
                          note = primer
source                    1..40
                          mol_type = other DNA
                          organism = synthetic construct
SEQUENCE: 50
cgactctaga ggatcaaccg tcgatcagaa ggagcgcaat                          40

SEQ ID NO: 51             moltype = DNA   length = 25
FEATURE                   Location/Qualifiers
misc_feature              1..25
                          note = primer
source                    1..25
                          mol_type = other DNA
                          organism = synthetic construct
SEQUENCE: 51
gaagtccagc tcgtcgagtc tggtg                                          25

SEQ ID NO: 52             moltype = DNA   length = 37
FEATURE                   Location/Qualifiers
misc_feature              1..37
                          note = primer
source                    1..37
                          mol_type = other DNA
                          organism = synthetic construct
SEQUENCE: 52
agaagtgaaa atttatttac caggagacaa ggacaga                             37

SEQ ID NO: 53             moltype = DNA   length = 25
FEATURE                   Location/Qualifiers
misc_feature              1..25
                          note = primer
source                    1..25
                          mol_type = other DNA
                          organism = synthetic construct
SEQUENCE: 53
gacatccaga tgacacagtc ccctt                                          25

SEQ ID NO: 54             moltype = DNA   length = 40
FEATURE                   Location/Qualifiers
misc_feature              1..40
                          note = primer
source                    1..40
                          mol_type = other DNA
                          organism = synthetic construct
SEQUENCE: 54
ctcaaagctg atctaaacact caccacggtt gaaggactta                         40

SEQ ID NO: 55             moltype = DNA   length = 40
FEATURE                   Location/Qualifiers
misc_feature              1..40
                          note = primer
source                    1..40
                          mol_type = other DNA
                          organism = synthetic construct
SEQUENCE: 55
agatagggtt gagtggatgg ccaaccaacg ctaatgtatc                          40

SEQ ID NO: 56             moltype = DNA   length = 40
```

| FEATURE | Location/Qualifiers |
|---|---|
| misc_feature | 1..40 |
| | note = primer |
| source | 1..40 |
| | mol_type = other DNA |
| | organism = synthetic construct |

SEQUENCE: 56

```
tagctagagc ttggcatcgg ttgacgggtt gctgaaatgc                              40
```

| SEQ ID NO: 57 | moltype = DNA  length = 21 |
|---|---|
| FEATURE | Location/Qualifiers |
| misc_feature | 1..21 |
| | note = primer |
| source | 1..21 |
| | mol_type = other DNA |
| | organism = synthetic construct |

SEQUENCE: 57

```
cactcaaccc tatctcggtc t                                                  21
```

| SEQ ID NO: 58 | moltype = DNA  length = 25 |
|---|---|
| FEATURE | Location/Qualifiers |
| misc_feature | 1..25 |
| | note = primer |
| source | 1..25 |
| | mol_type = other DNA |
| | organism = synthetic construct |

SEQUENCE: 58

```
gccaagctct agctagaggt cgacg                                              25
```

| SEQ ID NO: 59 | moltype = DNA  length = 1988 |
|---|---|
| FEATURE | Location/Qualifiers |
| source | 1..1988 |
| | mol_type = genomic DNA |
| | organism = Talaromyces cellulolyticus |

SEQUENCE: 59

```
atggcaaacc ctcctcacgg tggtatcctc aaggacttgg tggcccgcga tgcccctcgt        60
catgccgagc tcgaggctga agctgccacc tacctgcta ttcttctcac agaacgccaa        120
ttgtgtgatt tggagttgat tatgaatggt ggtttcagtc ctcttgaagg taagtctttt       180
tgtcgcacgc gatcgagaag attattagct aacattttc ttctataggt ttcatgaacg        240
agaaagatta cgatgggtat gcaacatatc ttgcgcgcgc agtgaaagga caaattttct       300
gactgactta gtgttgtcgc cgaatctcgc ctcgccgatg caaccttt ctccatgccc         360
attactctcg atgcctctgg cgaaaccatt aaagaccttg gcttgaaggc tggatctcgt       420
gtcacattac gcgatttccg tgacgaccgc aaccttgcta ttttgaccat tgatgatatc       480
taccgccctg acaagtgagt cctgcaatca gcttgtgcga cgaaacatgc tgaccccttt       540
taccaggacg aaagaagccc agctcgtctt tggaggtgac gaagagcacc ccgctatcgt       600
atatctcaat accaaggttc aggagttcta cattggagga aaggtcgaag ctgttaacaa       660
acttgcccac tacgactatg tcgctctccg atgtgagtta ctattcaaca gagacaaatag     720
tacatagact aaccatgtag acactcccgc tgaattgcgc acacacttcg acaagctcgg      780
ctggacccga gttgttgctt tccagaccag gtatgctaaa agcagacgat aggagttatt     840
tgaatgtcac tgacactagt agaaaccca tgcatcgtgc tcaccgtgaa ttgaccgtcc       900
gcgctgcccg tgctcgtcaa gccaatgtgc tcatccgccc cgtcgtcggt ctcaccaacg      960
ccggtgacat tgaccactc accccgtgcc gtgtctacca agcccttct cctcgttacc       1020
ccaacggcat ggctgtcctc ggtctttgc ctcttgctat gcgtatgggt ggtcctcgtg      1080
aggccatctg gcacgccatt atccgtaaga accacggtgc cacccacttc attgtcggac     1140
gtgaccacgc cggtcccgga aagaactcca agggtgtcga attttacggt ccttacgacg     1200
ctcagcatgc tgttgagaag tacaggtctg agttgggtat tgaggtggtt gaattccagc     1260
aggttaccta cctgcctgat accgacgagt acaagcctgt taatgaggtt tctgccggtg     1320
taaagactct tgatatctct ggtactgagc tcaggagacg tcttcgctcg ggtgctcaca     1380
tcccagagtg gttctcttac cctgaggtca tcaaggttcc ccgcgagtcc aaccccctc      1440
gcaatgctca aggtttcacc gtcttcctca ctggatacca gaactctggc aaggacgcca     1500
ttgcccgcgc tcttcaagtg actctcaacc agcaaggtgg ccgtccgtc tcgctcttgt      1560
tgggagagac cgtccgtcac gagctttcct cagagcttgg tttcagccgc gaagaccgcg     1620
acaaaaacat tcaacgtatt gcctttgtcg ctgccgagct caccaaggcc ggtgctgccg     1680
ttatcgctgc acccatcgct ccttacgaat catcccgaaa gacaccatct                 1740
ccgcagtcgg cacattcatt ctcgtccacg tcgccacccc tcttgagtac tgcgagaaga    1800
ccgacaagcg cggaatctac gcgaaggccc gccgcgcga tcaagggc ttcactggtg       1860
tcgatgaccc atacgaggct cccgccaagg ccgacctcgt ggtcgacgtt gagaagcaga     1920
gtgtccgcag tatcgtgcac gagattgtct tgattctcga gagccaggga ttcctcgatc     1980
ggtcttag                                                             1988
```

| SEQ ID NO: 60 | moltype = DNA  length = 1589 |
|---|---|
| FEATURE | Location/Qualifiers |
| source | 1..1589 |
| | mol_type = genomic DNA |
| | organism = Talaromyces cellulolyticus |

SEQUENCE: 60

```
atgaagggcg tcctcagcct ttcgctgctg ccgttgttga cggttgcgtc accggtgatg        60
ccgcgcacca tccacaacga cgctgctccc attctctctt cgtccaacgc cgttgaggtc       120
ccagattcat atatcattgt cttttaaagac catgtagatt ctgcttctgc cgcagcccat      180
```

```
cataactggg tgcaagacat tcacagccaa cacaccgagc tccgaaagcg gtctcaattc    240
ccattcgctg acaatgcctt tgccggtctc aaacacactt ttgacattgc cggcagcttc    300
cttggttact caggacactt cgaagagaat gtcattgagg ccattcgccg acaccccgat    360
gtgagttatc cgcacgtgcc ctactcctaa ggcaatgact aatacgcatc tccacctata    420
ggttgattac atcgagaagg attctcttgt ccacaccatg gaagatcccg cccttgagaa    480
gaacgcccca tggggtttgg ctcgtatttc gcaccgtgag agcttgagct tcggaagctt    540
caacaagtac ttgtacgctg ccgacggcgg tgaaggtgtt gacgtttatg tcattgacac    600
tggtaccaac atcgaccacg tcgacttcga gggtcgtgct tcctgggcag agaccatccc    660
cactgacgat gaggatgttg atggcaatgg tcacgtactt cactgctccg gaactattgc    720
gggcaagaag tacggtgttg ccaagaaggc caatgtctac gctgtcaagg tcttgaagtc    780
taacggttct ggaaccatgt ccgatgtcgt tcagggtgtc gaatgggctg ctactcagca    840
catcaagaag gtcaaggacg ccaaggccgg aaaagccaag ggcttcaagg gtagcgctgc    900
gaacatgagt ctcggtggtg gcaagtccgt cactcttgac aaggctgtca atgctgctgt    960
tgatgctggt atccacttcg ctgtcgctgc tggcaaccaa aacgccgact cctgcaactca  1020
ctcccctgcc gccgctgaga aggccgtcac cgtcggagcc tcgaccttgg ccgatgagcg   1080
tgcttacttc tccaactacg gcaagtgcaa cgacatcttt gctcctggtc tgaacattct   1140
ctctacctgg atcggcagca agtacgccgt caacaccatc tccggtacct ccatggcttc   1200
tcctcacatt gctggtcttt tggcctactt cctctctctc cagcctgcca gtgactccgc   1260
cttcgctgtt gccgagatta ctcccaagaa gttgaaggag aacctcattg ctattggtac   1320
ccagggcgct cttactgatg ttccctctga caccactaac gtaagttgac tctgttagtc   1380
tttcaatgca ttatcaacta acaactgtgt catagattct cgcctggaac ggtggtggct   1440
cagccaacta caccgacatc attgcccaag gtggttacaa gaccaagaca ctcagcaacg   1500
aagttgacga attgatcaac aagttggagg tcgtgaacga ggaactcggt gccatctaca   1560
gccacatcaa ggatgccatt gccgcataa                                     1589
SEQ ID NO: 61         moltype = DNA   length = 3534
FEATURE               Location/Qualifiers
source                1..3534
                      mol_type = genomic DNA
                      organism = Talaromyces cellulolyticus
SEQUENCE: 61
ccggtcgagt caggtattca tatcatccat tcatggattg ttatctgtga acacaacgcc     60
aacgttgcaa aatccggcca tttgatggca cggtttaaat gtcccttgct cattggggat    120
gaaatattc aacgtaagtt ctacatcctt ggctatcaat gtcgcttgcc gggtcaaatc    180
attcaatact gtcctggaca gtcctctttc caaccggtgg agtaatctag gcaaggttca    240
ttcggcaagt ttcctaggca tcatggttcc aaaaagtgaa aaagagact gggagaatca    300
tatatccatc tcagcctata tggctacgtc ttgaacagtg accttgccat aaatggcgac    360
atgaagtagg gttagggcta gggcttttct caggttatgg catcataagt cttggcaggg    420
acgttaatgt tagcatgcaa tcacgcaagc cgccaagccg atgtcgtgat tgcttttcga    480
tctggaactg gcagccgcta aactgtaatg ggattcacca aactggcgct tagccagata    540
tagtctagtg tctgatctct tgtttaaaaa tttcgcaatg tattgattgt attcaaatgt    600
agtaagtgta ttgcgattgt atacagattc gaagtaataa attgcgccag tcgactgaat    660
tgttacacat tttcttaaag gcacaaatag ttgaattggc attacttggc gagattgaaa    720
gagacgtttg agctgatgtg gcagtcgtca tggtgtaatt ttgggcgtat tccacgtaat    780
caattccctt ggtcaatgca tatctggcca ataaaattaa cgcgtccacc acggatagtt    840
gattaccttac tcgataaaag tgggatgtaa gtaatttaag gaaccgtacc acagtgatac    900
atacagcaac caccatctct tccgacatca gctccgatta tttcttcttc attccttta    960
ttttgaactc attctttttc tctttcttct tccttgatat atttgtttgt taattctctc   1020
ttcatatcaa taaaaatggc aaaccctcct cacggtggta tcctcaagga cttggtggcc   1080
cgcgatgccc ctcgtcatgc cgagctcgag gctgaagctg ccaccctacc tgctattctt   1140
ctcacagaac gccaattgtg tgatttggag ttgattatga atggtggttt cagtcctctt   1200
gaaggtaagt cttttttgtcg cacgcgatcg agaagattat tagctaacat tttttcttcta   1260
taggtttcat gaacgagaaa gattacgatg ggtatgcaac atatcttgcg cgcgcagtga   1320
aaggaacaat tttctgactg acttagtgtt gtcgccgaat ctcgcctcgc cgatggcaac   1380
cttttctcca tgcccattac tctcgatgcc tctggcgaaa ccattaaaga ccttggcttg   1440
aaggctggat ctcgtgtcac attacgcgat ttccgtgacg accgcaacct tgctattttg   1500
accattgatg atatctaccg ccctgacaag tgagtcctgc aatcagcttg tgcgacgaaa   1560
catgctgacc ccttttacca ggacgaaaga agcccagctc gtctttggag gtgacgaaga   1620
gcaccccgct atcgtatatc tcaataccaa ggttcaggag ttctacattg gaggaaaggt   1680
cgaagctgtt aacaaacttg cccactacga ctatgtcgct ctccgatgtg agttactatt   1740
caacagagac aatagtacat agactaacca tgtagacact cccgctgaat tgcgcacaca   1800
cttcgacaag ctcggctgga cccgagttgt tgctttccag accaggtatg ctaaaagcag   1860
acgataggag ttatttgaat gtcactgaca ctagtagaaa ccccatgcat cgtgctcacc   1920
gtgaattgac cgtccgcgct gccgtgctc gtcaagccaa tgtgctcatc caccccgttg   1980
tcggtctcac caagcccggt gacattgacc acttcacccg tgtccgtgtc taccaagccc   2040
ttcttcctcg ttaccccaac ggcatggctg tcctcggtct tttgcctctt gctatgcgta   2100
tgggtggtcc tcgtgaggcc atctggcacg ccattatccg taagaaccac ggtgccaccc   2160
acttcattgt cggacgtgac cacgccggtc ccggaaagaa ctccaagggt gtcgaatttt   2220
acggtcctta cgatgctcag catgctgttg agaagtacag gtctgagttg gtgattgagg   2280
tggttgaatt ccagcaggtt acctacctgc ctgatccga cgagtacaag cctgttaatg   2340
aggtttctgc cggtgtaaag actcttgata tctctggtac tgagctcagg agacgtcttc   2400
gctcgggtgc tcacatccca gagtggttct cttaccctga ggtcatcaag ttctccgcg   2460
agtccaaccc ccctcgcaat gctcaaggtt tcaccgtctt cctcactgga taccagaact   2520
ctggcaagga cgccattgcc cgcgctcttt aagtgactct caaccagaca ggtagccagt   2580
ccgtctcgct cttgttggga gagaccgtcc gtcacgagct ttcctcagag cttggttca   2640
gccgcgaaga ccgcgacaaa acattcaac gtattgcctt tgtcgctgcc gagctcacca   2700
aggccggtgc tgccgttatc gctgcaccca tcgctcctta cgaatcatcc cgaaaggctg   2760
ccaaagacac catctccgca gtcggcacat tcattctcgt ccacgtcgcc acccctcttg   2820
agtactgcga gaagaccgac aagcgcggaa tctacgcgaa ggcccgccgc ggcgagatca   2880
```

```
agggcttcac tggtgtcgat gacccatacg aggctcccgc caaggccgac ctcgtggtcg  2940
acgttgagaa gcagagtgtc cgcagtatcg tgcacgagat tgtcttgatt ctcgagagcc  3000
agggattcct cgatcggtct taggtttgct tgtgaacaaa accaaaagaa atgagttatg  3060
caattggttt agggtaatga atgtgcttga tatggaagca atgtgcatac agattaggag  3120
ctacatagag gccgttaatct agttatttgc atccctttc gccctgtaga tatagtttgt  3180
ggagtatgat caacgtgggg ttgatctgat aaagtcgtcc atatcggaga tttatccgat  3240
atccaatatc cgattatcgc aattggccat tgaactagag tattcgtcat ctactgacga  3300
tttgtacata tgtacttagt ttcaatcccc cttcttcctc caatccatct ggtgcaatta  3360
tagatagaga ggaaagaaaa tgacccaatc aatccaccac atagcccaaa ccggcttctc  3420
agacgcctca tcctacgaca aacacagacc aacctacacc gcgcacgaaa cagatctgat  3480
tctaaaccgc acgaatgtcg cgaaccgtaa gggtttgagg cttgttgacc tcgc  3534

SEQ ID NO: 62          moltype = DNA   length = 2858
FEATURE                Location/Qualifiers
source                 1..2858
                       mol_type = genomic DNA
                       organism = Talaromyces cellulolyticus
SEQUENCE: 62
gtcaattcag atcggctgcc gcctgcgccc caggtgacgt cgatgaaagc tgggcctagg  60
tcgtgcatgc ggtccatacg gtcgtataag ttctggacac cttgggcggt ctttgggggg  120
aagtattcga aggaaattcc aggtcggccg gtggccgcct gttcttggag cttttgcccg  180
acatgcatgt tgataggtcg gtcaattgtc tgctttttca atatcttctc ggtatgatgt  240
agcttgcaga acccaagtta tgtagttcaa ttgcaaaatc aagtctgatc aagaccgaaa  300
ctcaatcccg gagcactgag gttcgcacta attgatcaag ggtacaagaa tgaggggcac  360
aatgaaagca gtcttgaaaa tgacaggcag agaaattgaa agaaaggaga gagaggacc  420
tccgggacag gagaaatgaa agcaacaaaa ccccgacaga gctggagaga agttaaaggg  480
agcagcttgg tcaccggcaa tggatgctca tcataaaaaa ggaccctaaa cccgttatcg  540
gagtccggag aaatgacgct aattcggatt tggaagtccc cgccaatcgt gggaaattct  600
cgaagcagac aatttgctcg tgacaatcag ccagcaatga gagggagact gaaaaatatg  660
tatttacact caaagaatcc gatactgcta ttaggatcag tgttttctt ataagcaaat  720
gagcgttgga cgtggaaaat gaggaatcct cagtccctat actcggtcag cgacggaggg  780
gtgcgtgatc ggccaatcac agcctattat tttatcaaca tctgattggc tacttccgat  840
aagagcgaaa tatgcccctc cttgcaattt ttaccatcaa cgctaacagc aacactcaac  900
aaaccattca atcttgatac tcgctcccat tagtcaccac gcaggacaac acaacacgac  960
atcgcatctc agctttgacc attcccgccg caagcgattc gctgtcacaa acgccagata  1020
ccccaacatg gctgcccctc cctccgccga tcaggactac aagaccaatc tgttgtcttt  1080
gctgatagcc aacgatcgc tcgcatttgg cacgttcaca ttgaaatctg gtcgccagtc  1140
gccgtatttt ttgacctcga gtcgtcttta tactgcgcct ctgctgcgcc aggtgtcggc  1200
cgcgttcgcg aataccatct cgtccccgcc ttttgtgaat atagctgcag atggcagcat  1260
tacccccgaac tttgacattg ttttttgggta tgttacccta ttattcgtgc gcctgatatg  1320
cgtgtactga tttacttcaa atagccccgc ctacaaagga atcccgaat gcgtcggtgt  1380
tgtcaacgag ctcgctaccc gggatgcgct cgccggtacc aagacatggg acaacatcag  1440
ctactccttc aaccgcaaag aagccaaaga ccacggcgca gggggtaaca tcgtcggtgc  1500
gcctctcaag ggaaaacgtg ttttgatcgt tgacgacgtc atcaccgctg gtaccgcgct  1560
gcgtgaagct gtcggcatta ttcaaaagga aggcggaacc gttgccggtg ttgtgttgct  1620
gttcgatcgt caggaacggg tcagtgatac ggagcagaag agtgccattg gagccgcgga  1680
gagggacctt ggaggccgata ttcctatccg tgccggtgttg gtattccagg atttgattga  1740
taagcttgga gataagattg gtcaggagga ggtgcgcagg ttggaagagt accggaacac  1800
gtacaaggct caataaatgg ctgctgtggg atgaaatggg tatattaacg atttatgcta  1860
aaaatggctg ggtggaatac tgcgaaataa atataaatca gcttgaagga tgtatttta  1920
gcgcaaagtg ataaaatttt ctatgtaaat agtttgtaaa ataggattac tactttatat  1980
gcgttatgcg tatacatttc taaagtgtaa ccagtttagc tgggagtaca attttaacac  2040
tcttccatca atcaggttcc agatcagttt tctatctaca atcatgactc cccagtctct  2100
actcctttca agaatgacgc gttatgttcc aagctcccct ggttgatggc ggtaacccga  2160
tatattctag ccaggtcagg tcctagtgtg aggactaaca caggcacgtc cagtatcgta  2220
gcaaatagaa tatcagcata tataagtccc cttcccggga ccttgctcga gtcagtgact  2280
agcaggtacg tacgtaccca tcagactatc tactatctac tatgtacgga gtatatagtc  2340
ggtacttgac gcaaggcgag tctgatagag ggacaatatg cagttctgta gccaatcaat  2400
cgcggatggc agaccctcga tcgtcattgt ggatctttag cttccttatg ggcggggcgg  2460
tggttatttc agagccattt agccaatcat acatcgtagt ccgaaagtct aggattata  2520
aggctagacc aatctactgt caaccggtaa agcgggtctc tagtctttat cccgacctcc  2580
tctctttctc tttctccgat tcgaatgtga cacatacatc tgatcaattg ataagaatac  2640
ggattgccgt gtacgtgggc tgacagagct gagataaaat atcctggatg tgatatgtgg  2700
cgcatccagt accgacactg tgacaggatc cgtgtactac aattcattca tcgatcgttg  2760
gctaggcaaa aagtaggcaa ggtttgcaga tcgatatccc ggtacctggc taaaatcgag  2820
acccatctac atatagtact gactcggcgt tcacttat  2858

SEQ ID NO: 63          moltype = DNA   length = 1100
FEATURE                Location/Qualifiers
source                 1..1100
                       mol_type = genomic DNA
                       organism = Talaromyces cellulolyticus
SEQUENCE: 63
tgctatgcag ttgatgctac tgtgttctaa ataattgat agggttaggg tcgggtataa  60
ggcgatgcaa tgtatcaatt atcacgagaa ataatgcaga aaacacaat tccccgtatc  120
tgttgattct taaacaatct gatcaccaat ttgtagaaag aaacgattat aaggtgccat  180
ggtaatgctg gagtttacac aggatactac ttgttctgtt cattcaaatg aaccgtaatt  240
gcattctgtt ttgaccactc aacaaatcct acacaaaagt aagtggactt cagtgctcgc  300
tctacgcaag taaatacttg gcatatatgg cctcgtatat tcttacaatg aggtaaattc  360
```

-continued

```
cgatagatta ctgcccaact agtcaatctt aaatccttaa gagatacagg gggaggcgga    420
agtacctgaa accacgtaat aagacgttca gggtcatgtg aatgtatgta gtatccatgt    480
ccaatacaat tgataatagt atccagtatt atatctcatt caggtaagcg ccacgcgatt    540
cttcagatct acttaactgc cgactcgcca aacgaaacaa cgtttattcg tgaccccaga    600
aaatcaccgc ggagttgcgg aggaccagtt tgtacaatgc accgaaccaa gcgttggtca    660
tttttctgga aatgggccaa acgttagaag tgattggtca gagctacatc tgaaggtgaa    720
gcaatttccg gtatgcatac atgacagcaa gcttacctac caagaccaag ttattcccca    780
gcatttgccc catacttggc tttaatattg tgggatagca aacaatatcc acaacactga    840
tgataactaa actacaaatc tgacgttact tcagactact cacgtgtcaa aagcagttag    900
cgaggatcaa gtcttttagt ctggtcatta acaaacgcaa tttcgcaacc cgataatccg    960
cgatgataat atagcgactc caaggtcgta tttatattca atcaattccc cccaatttgg   1020
aatggatttt tggaatcatc gcatgccagg acaatcagtg aaacagtgac aaagtgaagc   1080
ttcttgatca tttagcaact                                               1100

SEQ ID NO: 64         moltype = DNA   length = 78
FEATURE               Location/Qualifiers
source                1..78
                      mol_type = genomic DNA
                      organism = Talaromyces cellulolyticus
SEQUENCE: 64
atgtctgcct tgaactcttt caatatgtac aagagcgccc tcatcttggg ctccttgctg     60
gcaacagctg gtgctcag                                                   78

SEQ ID NO: 65         moltype = DNA   length = 1356
FEATURE               Location/Qualifiers
source                1..1356
                      mol_type = genomic DNA
                      organism = Homo sapiens
SEQUENCE: 65
gaagtccagc tcgtcgagtc tggtggtggc ttggtccaac ccggtggatc cttacgtctc     60
tcttgtgcag ctagcggttt caacatcaag gacacctaca tccattgggt tcgtcaagct    120
cctggcaaag gtttggaatg ggttgcgcgt atctacccta cgaacggtta cacccgttat    180
gccgacagcg ttaagggccg tttcaccatt tctgccgaca cttccaagaa caccgcctac    240
ttgcagatga actccttgag agccgaggat actgccgtct actactgcag ccgttgggga    300
ggtgatgggt tctacgccat ggactactgg ggtcaaggaa cccttgttac cgttagctcg    360
gccagcacaa agggtccctc cgtcttccct ttggctccct cctccaagtc tacttccggt    420
ggtaccgctg cactgggttg cttggtcaag gactacttcc ctgagccgt cactgtcagc    480
tggaattctg gcgcattgac ttctggtgtc cacacttttc ccgctgttct ccaatcttcc    540
ggcttgtaca gcctaagcag cgttgtcact gtgcccttct cctccttggg cactcagacc    600
tacatctgca acgtcaacca caagccctcc aacacgaagg ttgacaagaa ggtgaacctc    660
cccaagtcct gcgataagac ccacacctgt cctccctgtc ctgctcctga actgttgggg    720
ggaccctcag tgttcttgtt ccctcccaag cccaaggaca ctctcatgat cagccgtact    780
cctgaggtta catgcgtcgt cgtcgatgtc tcccatgagg atcctgaggt caagttcaac    840
tggtacgtcg acggtgtcga ggtccacaat gccaagacca gcctcgtga agaacagtac    900
aactccacct accgcgttgt ttcagtcttg accgtgttgc accaggattg gctgaacggc    960
aaggagtaca agtgcaaggt ctccaacaag gccctgcctg ctcccatcga gaaaaccatc   1020
agtaaggcaa aagtcaacc tcgcgaaccc caggtttaca cccttcctcc ttctcgggac   1080
gaactcacca gaaccaggt ctcgttgact tgccttgtta agggattcta ccctagcgat   1140
attgccgttg agtgggagtc caatggtcag cccgagaaca actacaagac taccctcct   1200
gttctcgact ctgacggatc tttcttcctc tacagcaagt tgaccgtcga caaaagccgt   1260
tggcagcaag gcaacgtttt ctcctgctct gtcatgcacg aggctctcca caaccactac   1320
acacagaagt ctctgtcctt gtctcctggt aaataa                              1356

SEQ ID NO: 66         moltype = DNA   length = 1680
FEATURE               Location/Qualifiers
source                1..1680
                      mol_type = genomic DNA
                      organism = Talaromyces cellulolyticus
SEQUENCE: 66
attttcactt ctttcttcgc ctattgattg ggctatgaca aaattaggag agataggttg     60
gacgttgtca agtcaaaatg taccgaacac gatgcgttga tatgctgcac atgtgcctag    120
tatccattcg ttcctatttta tattaaattg aaatttttct atccaattac tgagctaaaa    180
catacttcag cactgtaagc gccagcctaa gttatgctat gttagactgt ccggattcgg    240
ctggcactgg cttttgtgat ccccagtatc atgtaaaggt atccgcctgt ttgttagggg    300
gtcttaaatg ttgtataaag tttcttgcta ggctgtttat gcttgataga gaatatatat    360
atatatctag ctgctattaa tatccttgtt tcaatgtctt agacttccaa ggttacctac    420
ccgcgtgcgt ggactaatac aaacaatctc actcaagaca atcttataca aactcggatt    480
ctggtcaatc cgttccttgg ttatattgct aaaaaaacta ggtagcccaa aattccatct    540
caagccgtat aagaactttc aaattcacca tggtactctc acgggcgaag catctccgtc    600
ttccatctgc caaaatccat taccaaaatc ggaagtaccc gaatgtagca atgaacaat     660
aactttcgca ccatctagcg gatcctttgt gccacgatag ttgttgaacg cagttttgca    720
atacccagga ctaactgctt ggatgataac actctcattc gccgggtctt tcccatattc    780
gaccgtgagc atgttaaggg ccgtctttga ggcgcagtac gcgatagtaa cagttggagg    840
cagcttgcca gatgatgata ggcccaaaga accccgtagt gatgatacgt ttattatgtg    900
gcctcgaggc gactgacgca aaagtggtag gaatagatct atggtcattg cgaccgatgt    960
gacattcaca tcaaaagttc ggttgtaagt agaccgcatt tcggaaaatg aagtctgggt   1020
gaaggcaacg gcagcattgt ttatcagaac tagacatctg ttagagaatt tctaaagccc   1080
gctcactcga gaatgaaata ggcttaccat ccagtctacc atatgttgtc tcgaccgcct   1140
tagcaaaagc aatgaggcta tcgtcgcgag tcacatcaac ctccataacg tcgatcttgg   1200
```

```
attgaacagc gagctctctc aaccgcttaa gtgcctgatt tccgtcttcc ttattccggc  1260
atcctaagat gaagtgatcg gatgactat gcagacttaa agcctggagg gtaccaaacc   1320
cgatgcctga caattattag tgatcatata gaatgagtat catggccatc gcaaatctac  1380
ctctgtttgc tccagttata agaattagcc ttgatgacat cttgtgagag aagtaaaaga  1440
taatagcaga tgaatttcga tcgtatactg gttgtattgg caatcttgac gagaatggtt  1500
tcattgtcag accatcagtt cccttttata acctgccatt ctctccttta taaataatta  1560
ttcggtttta acacggagat actcggattt catcacacaa attgcatttc ttccgatagt  1620
tgttgaagat cggaagtcct tcgaatgatc atttctataa ctacgcctta ccgttttcgg  1680

SEQ ID NO: 67            moltype = DNA  length = 645
FEATURE                  Location/Qualifiers
source                   1..645
                         mol_type = genomic DNA
                         organism = Homo sapiens
SEQUENCE: 67
gacatccaga tgacacagtc cccttctagc ctttctgcct ctgttggaga tcgtgtcacc  60
atcacttgtc gtgcttctca agacgtcaac acagccgttg cctggtatca gcagaaaccc  120
ggcaaagctc ccaagttgct gatctacaag gctagcttcc tgtacagcgg tgtcccttct  180
cgcttctcag gttcccgttc tggtaccgac ttcaccttga ccatttccag cttgcaaccc  240
gaggatttcg ccacgtacta ctgccagcaa cactacacca ctcctcccac ctttggccaa  300
ggtaccaagg tcgagatcaa gcggactgtt gccgcacctt ccgtcttcat cttccctccc  360
tcggatgagc agctcaagtc tggaactgcg tctgtcgttt gcttgctcaa caacttctac  420
cctcgtgaag ccaaggtcca gtggaaggtc gacaacgctt tgcagtccgg caatagccaa  480
gagtccgtta ccgaacagga cagcaaggac tccacttact ccttgagttc cactctcacc  540
ttgtccaagg ccgattacga gaagcacaag gtctacgctt gcgaagtgac ccatcaaggt  600
ctctctagcc ctgttactaa gtccttcaac cgtggtgagt gttag                 645

SEQ ID NO: 68            moltype = DNA  length = 497
FEATURE                  Location/Qualifiers
source                   1..497
                         mol_type = genomic DNA
                         organism = Talaromyces cellulolyticus
SEQUENCE: 68
atcagctttg agtgcagcaa aaatgcttcc gactgtcttc ttatattgat atcatatttt  60
tcaattcact ttgtctcaag tttcaatata tcgagaaaat agtatccaag atgaactgta  120
ataattccga tatcctata caggtttata gtaaattact ctatttcata atgcgtccat    180
ccgagaagtc tggcggcctt atcagtagtc caaaacgcct ggttttttaga catgtcacct  240
ctaatctccg cttgaggaaa atgcgtccga gcaagttctt tcgacggggt gtcttgggtc  300
gtagttggag atatgatatt tattacttcg aatcctttga tattctcact cttttcaatt  360
gccaaaaggc aagctcttgc cactgcgcga ggattaaccc atccccagag ttgtcgaacc  420
ccagattcat accatttatc gtggtgtctt tttctaacat ctctcaatgg ggcaacctca  480
tgtattctca aacaagc                                                 497

SEQ ID NO: 69            moltype = DNA  length = 1812
FEATURE                  Location/Qualifiers
source                   1..1812
                         mol_type = genomic DNA
                         organism = Talaromyces cellulolyticus
SEQUENCE: 69
cactcaaccc tatctcggtc tattcttttg atttataagg gattttgccg atttcggcct  60
attggttaaa aaatgagctg atttaacaaa aatttaacgc gaattaattc tgtggaatgt  120
gtgtcagtta gggtgtggaa agtccccagg ctccccagca ggcagaagta tgcaaagcat  180
gcatctcaat tagtcagcaa ccaggtgtgg aaagtcccca ggctccccag caggcagaag  240
tatgcaaagc atgcatctca attagtcagc aaccatagtc ccgcccctaa ctccgcccat  300
cccgcccccta actccgccca gttccgccca ttctccgccca catggctgac taattttttt  360
tatttatgca gaggccgagg ccgcctctgc ctctgagcta ttccagaagt agtgaggagg  420
cttttttgga ggcctaggct tttgcaaaaa gctcccggga gcttgtatat ccattttcgg  480
atctgatcag cacgtgatga aaaagcctga actcaccgcg acgtctgtcg agaagtttct  540
gatcgaaaag ttcgacagcg tctccgacct gatgcagctc tcggaggcg aagaatctgc  600
tgctttcagc ttcgatgtag gagggcgtgg atatgtcctg cgggtaaata gctgcgccga  660
tggtttctac aaagatcgtt atgtttatcg gcactttgca tcggccgcgc tcccgattcc  720
ggaagtgctt gacattgggg aattcagcga gagcctgacc tattgcatct cccgccgtgc  780
acagggtgtc acgttgcaag acctgcctga aaccgaactg cccgctgttc tgcagccggt  840
cgcggaggcc atggatgcga tcgctgcggc cgatcttagc cagacgagcg gttcggccc    900
attcggaccg caaggaatcg gtcaatacac tacatggcgt gatttcatat gcgcgattgc  960
tgatccccat gtgtatcact ggcaaactgt gatggacgac accgtcagtg cgtccgtcgc  1020
gcaggctctc gatgagctga tgctttggc cgaggactgc cccgaagtcc ggcacctcgt  1080
gcacgcggat ttcggctcca caatgtcct gacggacaat ggccgcataa cagcggtcat  1140
tgactggagc gaggcgatgt tcggggattc ccaatacgag gtcgccaaca tcttcttctg  1200
gaggccgtgg ttggcttgta tggagcagca gacgcgctac ttcgagcgga gcatccgga   1260
gcttgcagga tcgccgcggc tccgggcgta tatgctccgc attggtcttg accaactcta  1320
tcagagcttg gttgacggca atttcgatga tgcagcttgg gcgcagggtc gatgcgacgc  1380
aatcgtccga tccggagccg ggactgtcgg gcgtacacaa atcgcccgca gaagcgcggc  1440
cgtctggacc gatggctgtg tagaagtact cgccgatagt ggaaaccgac ggttcggccc  1500
tcgtccgagg gcaaaggaat agcacgtgct acgagatttc gattccaccg ccgccttcta  1560
tgaaaggttg ggcttcggaa tcgttttccg ggacgccggc tggatgatcc tccagcgcgg  1620
ggatctcatg ctggagttct tcgcccaccc caacttgttt attgcagctt ataatggtta  1680
caaataaagc aatagcatca caaatttcac aaataaagca ttttttttcac tgcattctag  1740
ttgtggtttt tccaaactca tcaatgtatc ttatcatgtc tgtataccgt cgacctctag  1800
```

```
                                                              -continued
ctagagcttg gc                                                              1812

SEQ ID NO: 70          moltype = DNA  length = 1364
FEATURE                Location/Qualifiers
source                 1..1364
                       mol_type = genomic DNA
                       organism = Talaromyces cellulolyticus
SEQUENCE: 70
atgaagacta cctctgtgct cgcagccgcc gcgctggccg gcgctgctac cgccaaggtc    60
cacaagctca agctggacaa ggtgcctctc tctgagcaat tgtatgaca ttctcaactc    120
ttcgctttaa tttgtttcta tggtcttgaa ctgatgatga tttgttaaag gataaacgcg    180
gcatgaacga ccacatgcgg tctttgggtc agaagtacat gggcgttgtc cccgagggaa    240
tgtaccagga cacctccatc cgaccggagg gcggccacga tgtgctggtc gataactattc    300
tgaacgctca gtgtatgtga ataccatcgg atgatcttga tgatttgatg ctaactattc    360
gttctagact tctcagagat caccatcggt acacccccac agaacttcaa ggtcgtcctt    420
gataccggga gctcgaactt gtgggttcct tcatcctctt gcaactcgat tgcttgctac    480
ttgcacaaca agtatgactc gtcctcttcc tctacctaca agaagaacgg cagcgacttt    540
gccatccagt atggctcagg tagccttgag ggcttcgttt cccgcgacac tgtcacgatt    600
ggcgaccttt ccattaagga ccaagacttc gccgaagcca caaacgagcc tggcttggct    660
tttgccttgg ccgctttga cggtattttg ggtcttggtt tcgacaccat ctcagtcaac    720
aagattgtcc ctccgttcta taacatgcta aaccagaagt ctcttgatga gctgtctttt    780
gccttctacc tcggcgatag caacaaggaa ggtgatgatt caggctgagct gtttgctgtg    840
attgacgaga gccactacac tggaaagttg gtcaagatcc ctctccgccg caaggcctac    900
tgggaggtgg actttgatgc cattgctttt ggcgacaacg ttgctgagct tgagaacacc    960
ggagtcatcc ttgacactgg tacttccctc attgctcttc cttccactct tgccgagctc    1020
ttgtaagtca tctattactc gctacacata aaaatatatc taatatctt tttaggaaca    1080
aggagattgg tgcctccaag tcatggaacg tcaatacac tgtcgactgt gccaagcgtg    1140
actctcttcc cgacctcacc gtcacccctga gcggatacaa cttctccatc agcgctttcg    1200
actacgtttt ggaagtccag ggatcttgca tcagcgcttt catgggcatg gacttccctg    1260
agcctgtcgg ccctctctgct atccttggtg atgctttcct ccgcaagtgg tacagcgtct    1320
acgacttggg caacggtgcc gtcggtctcg ccaaggccaa gtaa                    1364

SEQ ID NO: 71          moltype = AA  length = 395
FEATURE                Location/Qualifiers
source                 1..395
                       mol_type = protein
                       organism = Talaromyces cellulolyticus
SEQUENCE: 71
MKTTSVLAAA ALAGAATAKV HKLKLDKVPL SEQFDKRGMN DHMRSLGQKY MGVVPEGMYQ    60
DTSIRPEGGH DVLVDNFLNA QYFSEITIGT PPQNFKVVLD TGSSNLWVPS SSCNSIACYL    120
HNKYDSSSSS TYKKNGSDFA IQYGSGSLEG FVSRDTVTIG DLSIKDQDFA EATNEPGLAF    180
AFGRFDGILG LGFDTISVNK IVPPFYNMLN QKSLDEPVFA FYLGDSNKEG DDSEATFGGI    240
DESHYTGKLV KIPLRRKAYW EVDFDAIAFG DNVAELENTG VILDTGTSLI ALPSTLAELL    300
NKEIGASKSW NGQYTVDCAK RDSLPDLTVT LSGYNFSISA FDYVLEVQGS CISAFMGMDF    360
PEPVGPLAIL GDAFLRKWYS VYDLGNGAVG LAKAK                              395

SEQ ID NO: 72          moltype = AA  length = 26
FEATURE                Location/Qualifiers
source                 1..26
                       mol_type = protein
                       organism = Talaromyces cellulolyticus
SEQUENCE: 72
MSALNSFNMY KSALILGSLL ATAGAQ                                         26

SEQ ID NO: 73          moltype = AA  length = 490
FEATURE                Location/Qualifiers
source                 1..490
                       mol_type = protein
                       organism = Talaromyces cellulolyticus
SEQUENCE: 73
MKGVLSLSLL PLLTVASPVM PRTIHNDAAP ILSSSNAVEV PDSYIIVFKD HVDSASAAAH    60
HNWVQDIHSQ HTELRKRSQF PFADNAFAGL KHTFDIAGSF LGYSGHFEEN VIEAIRRHPD    120
VDYIEKDSLV HTMEDPALEK NAPWGLARIS HRESLSFGSF NKYLYAADGG EGVDVYVIDT    180
GTNIDHVDFE GRASWGKTIP TDDEDVDGNG HGTHCSGTIA GKKYGVAKKA NVYAVKVLKS    240
NGSGTMSDVV QGVEWAATQH IKKVKDAKAG KAKGFKGSAA NMSLGGGKSV TLDKAVNAAV    300
DAGIHFAVAA GNDNADSCNY SPAAAEKAVT VGASTLADER AYFSNYGKCN DIFAPGLNIL    360
STWIGSKYAV NTISGTSMAS PHIAGLLAYF LSLQPASDSA FAVAEITPKK LKENLIAIGT    420
QGALTDVPSD TTNILAWNGG GSANYTDIIA QGGYKTKTLS NEVDELINKL EVVNEELGAI    480
YSHIKDAIAA                                                           490

SEQ ID NO: 74          moltype = DNA  length = 4509
FEATURE                Location/Qualifiers
source                 1..4509
                       mol_type = genomic DNA
                       organism = Talaromyces cellulolyticus
SEQUENCE: 74
atgtcgagaa gaatacggaa ccctgattcc gcaggctcga gtcaaccct aagtaattca     60
ccggtaccaa tagccgccga atccggcacg gaacctgtgt acctaggtcc gtatcgaata    120
gcgaagtttt ccgtctattc ttcgaatttt gtatacatgc ttaccttggc tcaaaggtac    180
```

-continued

```
tcacaaagtc cgaagaataa attatagaac cgatgtgaaa cggggacagt tggcaaccc      240
cttgtactat gtacattgta tggatctcgt ctcgactctc gagacgaggg tttcgtacca     300
accaaagact caaaacttgg ggtaactaag cgatcggctg cgtagtactc catactccat     360
aaataccccg gtgaattcgc ctcttgccca tggaatgagc gagaatttac ccttggagtc    420
atcgcgtaa atgactcaca tatcatgtct gccttcactc tcctcaacct ttgaaattcc      480
ggttaatgtt aaggcgaggt gtcctctacg gaatggcttt gtagatttga gataagacta    540
cgccgtaact taagggatcc acatactcca tattgatagt ctcaggaccg agatagtctg     600
gagtaaccc gtacccaatc aacgtcctca gactcgccac ctggttacaa tatttcggtg      660
cttgtgccga tatacctccg ttgcgtgagc cttgatagcc aacaagaaat gattcaaaat    720
taagatttga gaaaatccgg agtacgcagt gcctgcagtg taaaaaataa tgtatttacc    780
taatgccaat atgtcgatgc caaagtacta ctagcaaaga cactagatat gcagcaaact    840
cgatgtttag gtacatgtaa ccatatcctg gggtcaggta cgaacgccat caattaatct    900
cgtaaactag ctgtcacacg acagtatcat ttgatagttc caatgttcca tgctcccct     960
caaatgtcac tggatgatac gaatttggct gtgacttgaa cagatagacg gaaaacagtc   1020
cgatcattat ccggagtacg catgtacgag atagtctggg gatcctcggc tgccccgatt    1080
gggggttagtg cgggttccct tatcttgata cgccgtctgg aggcgcaggt gattgttacg   1140
gtgtgttccg tgatagataa gttagacatc cgataataac ctatcttcta gatagacggc   1200
aggtacgtat gtagatagat agatgacaca gtcataagac agttttattt accatacata   1260
gtatagtcat ttgacaaaca cttgatgact atgagcagta agtccagaca agagcataga   1320
ctagaaatga tgtgatcatc aataggtacg gagtcgtacc accccccggat tatcttggct  1380
ggcttagtca cgcccaaaca gacggtacg gatgagacac aagcaaagag cgacattccg     1440
aagaattctc gtgacggaaa cgagaatgcc gccggcgtg ataggggga atttttatctt    1500
ttcccttttct gacattcagt gtttacaata caatacggaa ttacggaacc ccggttttcg   1560
caaccggtgg aattacctaa tgggtgacct gaatttatta gataacgatg aacaatttgt   1620
tggatcttcc gtagatcgat ttggacttga taggtgcttc caaggttgtt gctgctcaca   1680
tggtcgcttg cgttatctgc ctacagaatg aggaagatgt attccgcacg tactccggtc    1740
gcgacagata tgcgacgatt gcaatatgta ctacatagtt agtacataca actctagact   1800
agactctata ttatgtagag tgtaagagaa aaagaaagaa gataacggca gggtctattt   1860
gattgcgcta taatatgcgc cgctgtatgg ttccccagat ctgcgtgaga tatcacctca   1920
tcctatcatc attccaggtc aaagtctcgt catcatgaat tggtattatt acccagtacg   1980
taaaccacgt atcgaggcgt atcggtgtat taaagataga gctactgcat tggctctagt   2040
cctatcttg cccccggaatc cggccgtgg atgacgatat gatgctgttt gtccttcagc    2100
taaacacgga cgatcctta cagggtgcgg ttaattatta aggatataat tctaatcaac    2160
gactctggct gtgctatatt aacaatgtct tctaagtggt catgatgtgt acgtacttcg    2220
tacacatgct acatgcaatc gagtacgtaa ctccagatct cgcgccgtacc cgcgatcccc  2280
gggccatcat gcaaatgtaa ccgcttggaa cacgcactgc agtgcataaa agccacagcc   2340
tcgcttccca atccggttta gacgcgtttt gtcttgctgt tttgggagca gccagacccc   2400
acattccact aacccactct ttttcagcgc ttattctcgt aagattcgta cgaaaaatac   2460
atctgcccac actatccacc agctcggcca ctcttcggtg agaacgctgc catgagaaaa   2520
aaatctgcga ctctgcaaca gagtgaggca cggctgaacc gagctgattg tcaccctttg   2580
cccaatgccc agacagccca gacagcccag acagcccaga cagcccagaca              2640
gcccagacag ccagtgcttg gttaattttt actaagggta aaaacctaaa aaaaagaaac   2700
gaaaaaaaaa aaaaaaaact tttctttttt gccccccaaa cacttggccg acagtcaaag   2760
ggttcccccca cacggtactc cgtacttgct acgtacacta actaaagaaa aaatctcctg   2820
attgagtctg tgtctgtctg tcgctgctaa actcggataa ccccccgttc ccgatcaccc    2880
gtcgaaaaga gcagcagcca tttaacattt ttcccctcca ttcctccttc ttggaacttt   2940
ccctcccctc ctcatcctta catctccctg cgtgcgcgcc tgcctgccta cttacactgc   3000
cactcccag atttttctttc tcttgtttct tctccagact ttcttttcctc ctccacctcg   3060
cctcaccaca ccaccaccac cactcaccac gccaacaaca ccgcactacc actactgctt   3120
caaagatcga tcaggccatt atcaaggagg atcgacgtct tattccatcg accaccctgt    3180
tgatcacctc ggctggagcg ctcgactccc tggcttcctt cccagcttta tttaaacccg    3240
tcacccgcca ggtctcttca catgtcaccg tcatcttcgt cagtgggttt ttccaatctg    3300
ctgaaccac agtcagactc tgtcgaccct acggataaca catcttccac tgctaccacc    3360
actaccaccg gcacagactc caactcagac aaggaaatgg cgtcctctgt cagtctgctc   3420
ccaccactca tgaagggtgc ccgccccgcc gcggaggaag tgcgacagga cctcccctcgt    3480
ccatacaagt gtcctctttg cgatcgtgct tccatcgtc tagagcacca aactcgtcac     3540
attcgtactc acaccggcga gaaacccat gcctgccagt ttccaggctg cacgaaacgg    3600
ttcagtcgtt cagatgaatt gactcgtcac tcgcgcattc acaacaaccc caactcgaga    3660
agaagtaaca aagctcagca tattgctgcg gctgcggcgg ccggtcagga ttcgggtatg     3720
cttaacgctg ctgcctcgat gatgcctcct ccaagcaaac ccattactcg ctcggctcca   3780
gtgtctcagg tcggatctcc ggatgtgtct cctccgcact cttacaccaa ctacacctcg   3840
catttgcggg cgggtctggg tccttattca cgcaacagcg accgtgcttc atctggtatg   3900
gatattaatt tgctcgcgac tgctgcttca caagtcgagc gcgatcacta cggaggctcg    3960
tctcgtcatt acccttcag ctctcgatac tcgggtactc tggacgctct accgtcgctt    4020
tccgcctatg ccatttctca gagcatgagc cggtcgcatt tcacgagga tgaggacaac    4080
tacgacatc accgggttaa gcgctctcgt cctaactcac caaactcgac tgcgccatcc   4140
tcgcctacat tctctcacga ttcattgtcg cctaccccg atcacactcc tcttgcaacc    4200
ccagcacact cgcctcgttt gcgtcctat ggagccgcag atttgcaatt accttccatc    4260
cgtcatttgt cgttacacca cactcccgca ctcgcaccaa tggagcctca agccgaggga   4320
cctaatgttt acaacccgg tcagcaccac ggtggaccca gcatcaagga catcatgagc    4380
aggcccgacg gcaccccagcg taagcttcct gttccgcacaag tacccaaaat cccggtgcag   4440
gacatgttgg caccgaacgg atattcctcc aacactccgt ccgtcaacgg ttccgtgatg    4500
gagttataa                                                             4509
```